US012621279B2

(12) United States Patent
Wu et al.

(10) Patent No.: US 12,621,279 B2
(45) Date of Patent: May 5, 2026

(54) DATA TRANSMISSION METHOD, INTERNET OF THINGS SYSTEM, ELECTRONIC DEVICE, AND STORAGE MEDIUM

(71) Applicant: BOE Technology Group Co., Ltd., Beijing (CN)

(72) Inventors: Congrui Wu, Beijing (CN); Xitong Ma, Beijing (CN); Youxiang Xia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 310 days.

(21) Appl. No.: 18/284,437

(22) PCT Filed: Jan. 4, 2023

(86) PCT No.: PCT/CN2023/070402
§ 371 (c)(1),
(2) Date: Sep. 27, 2023

(87) PCT Pub. No.: WO2023/142925
PCT Pub. Date: Aug. 3, 2023

(65) Prior Publication Data
US 2024/0163267 A1     May 16, 2024

(30) Foreign Application Priority Data
Jan. 29, 2022    (CN) .......................... 202210111749.8

(51) Int. Cl.
*H04L 9/40*          (2022.01)
(52) U.S. Cl.
CPC .................................. *H04L 63/045* (2013.01)

(58) Field of Classification Search
CPC ..................................................... H04L 63/045
See application file for complete search history.

(56) References Cited

U.S. PATENT DOCUMENTS

| 8,484,716 B1 | 7/2013 | Hodgson et al. |
| 2018/0054490 A1 | 2/2018 | Wadhwa et al. |
| (Continued) | | |

FOREIGN PATENT DOCUMENTS

| CN | 102036231 A | 4/2011 |
| CN | 109981771 A | 7/2019 |
| (Continued) | | |

OTHER PUBLICATIONS

Office Action dated Dec. 1, 2023, issued in counterpart CN Application No. 202210111749.8, with English translation. (25 pages).

*Primary Examiner* — Simon P Kanaan
(74) *Attorney, Agent, or Firm* — WHDA, LLP

(57)         ABSTRACT

A data transmission method, applied to a security platform in an IoT system, including: receiving a first request data packet including feature data and collection channel information corresponding to the feature data; matching the feature data in the first feature database; in response to feature information matched with the feature data existing in the first feature database, generating a first feedback data packet, and sending it to the service terminal, so that the service terminal performs operations according to the first feedback data packet; and generating a match success result data packet, performing an encryption operation on the match success result data packet, and sending an encrypted match success result data packet to the server, so that the server obtains the match success result data packet through a decryption operation, and performs a service recording according to the match success result data packet.

18 Claims, 10 Drawing Sheets

(56) References Cited

U.S. PATENT DOCUMENTS

| | | | | |
|---|---|---|---|---|
| 2020/0067708 | A1 | 2/2020 | Subba | |
| 2021/0144130 | A1* | 5/2021 | Brun | H04W 12/35 |
| 2023/0125310 | A1* | 4/2023 | Zhang | G06N 20/00 |
| | | | | 726/22 |
| 2024/0291668 | A1* | 8/2024 | Zhu | G16Y 30/10 |

FOREIGN PATENT DOCUMENTS

| | | | | | | |
|---|---|---|---|---|---|---|
| CN | 111683367 | A | | 9/2020 | | |
| CN | 111917727 | A | | 11/2020 | | |
| CN | 112165479 | A | | 1/2021 | | |
| CN | 112217876 | A | | 1/2021 | | |
| CN | 112839062 | B | * | 8/2021 | | H04L 63/08 |
| CN | 114500061 | A | | 5/2022 | | |
| CN | 115459949 | A | * | 12/2022 | | H04L 63/0478 |
| CN | 116055207 | A | * | 5/2023 | | H04L 63/0442 |
| KR | 102189301 | B1 | | 12/2020 | | |
| KR | 20250075971 | A | * | 5/2025 | | G16Y 30/10 |
| KR | 20250120823 | A | * | 8/2025 | | H04L 63/107 |

* cited by examiner

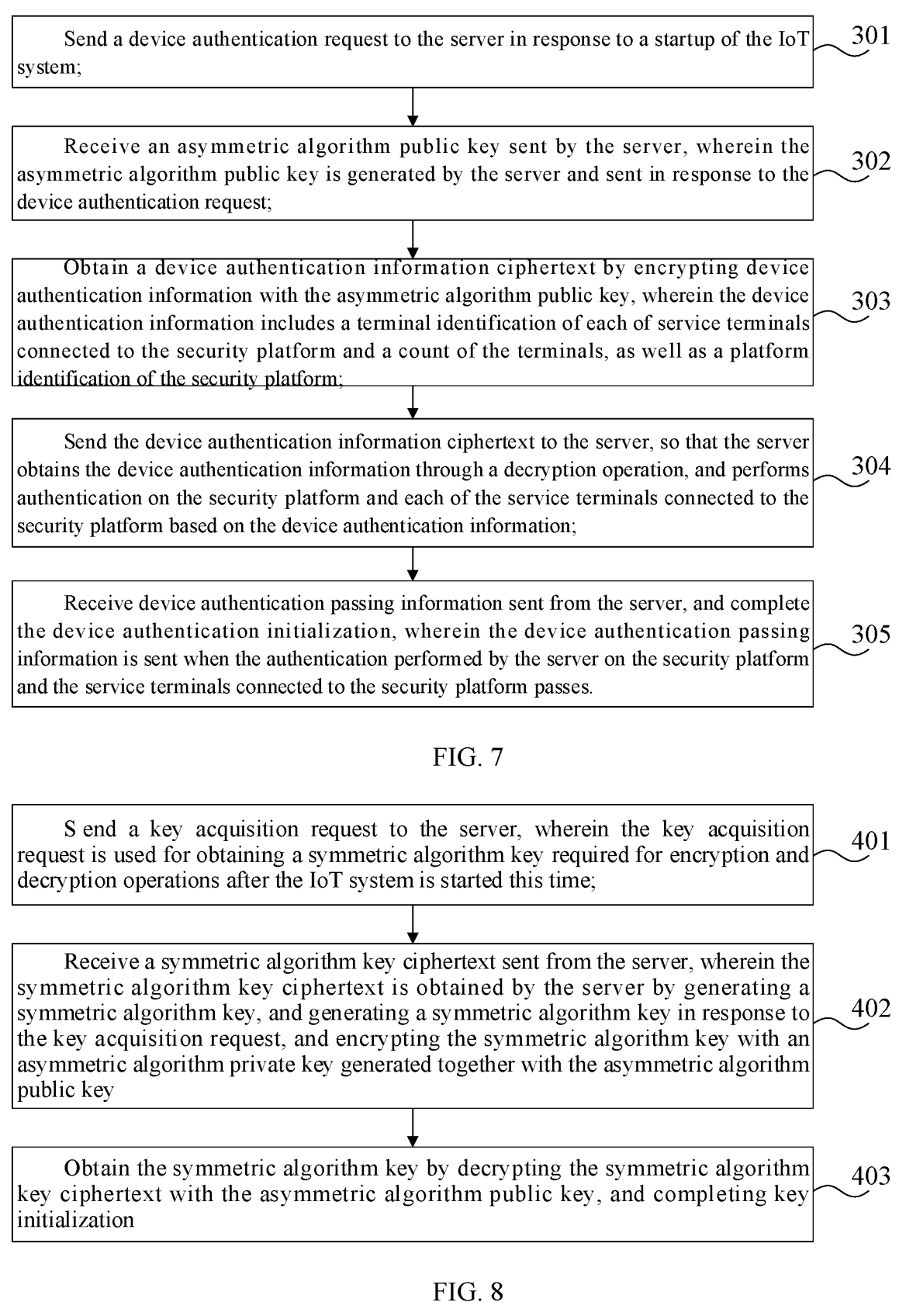

| | |
|---|---|
| Send a device authentication request to the server in response to a startup of the IoT system; | 301 |
| Receive an asymmetric algorithm public key sent by the server, wherein the asymmetric algorithm public key is generated by the server and sent in response to the device authentication request; | 302 |
| Obtain a device authentication information ciphertext by encrypting device authentication information with the asymmetric algorithm public key, wherein the device authentication information includes a terminal identification of each of service terminals connected to the security platform and a count of the terminals, as well as a platform identification of the security platform; | 303 |
| Send the device authentication information ciphertext to the server, so that the server obtains the device authentication information through a decryption operation, and performs authentication on the security platform and each of the service terminals connected to the security platform based on the device authentication information; | 304 |
| Receive device authentication passing information sent from the server, and complete the device authentication initialization, wherein the device authentication passing information is sent when the authentication performed by the server on the security platform and the service terminals connected to the security platform passes. | 305 |

FIG. 7

| | |
|---|---|
| Send a key acquisition request to the server, wherein the key acquisition request is used for obtaining a symmetric algorithm key required for encryption and decryption operations after the IoT system is started this time; | 401 |
| Receive a symmetric algorithm key ciphertext sent from the server, wherein the symmetric algorithm key ciphertext is obtained by the server by generating a symmetric algorithm key, and generating a symmetric algorithm key in response to the key acquisition request, and encrypting the symmetric algorithm key with an asymmetric algorithm private key generated together with the asymmetric algorithm public key | 402 |
| Obtain the symmetric algorithm key by decrypting the symmetric algorithm key ciphertext with the asymmetric algorithm public key, and completing key initialization | 403 |

FIG. 8

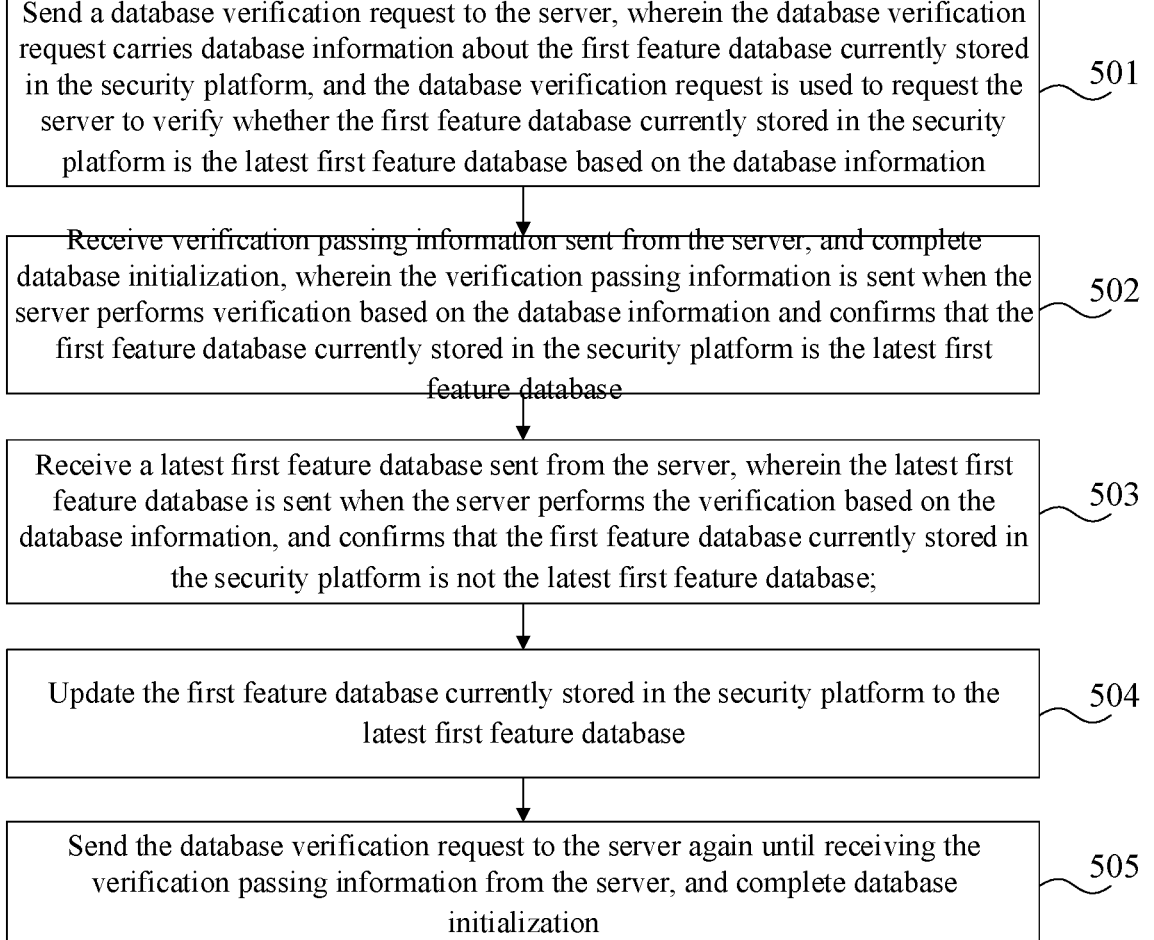

Send a database verification request to the server, wherein the database verification request carries database information about the first feature database currently stored in the security platform, and the database verification request is used to request the server to verify whether the first feature database currently stored in the security platform is the latest first feature database based on the database information    501

Receive verification passing information sent from the server, and complete database initialization, wherein the verification passing information is sent when the server performs verification based on the database information and confirms that the first feature database currently stored in the security platform is the latest first feature database    502

Receive a latest first feature database sent from the server, wherein the latest first feature database is sent when the server performs the verification based on the database information, and confirms that the first feature database currently stored in the security platform is not the latest first feature database;    503

Update the first feature database currently stored in the security platform to the latest first feature database    504

Send the database verification request to the server again until receiving the verification passing information from the server, and complete database initialization    505

FIG. 9

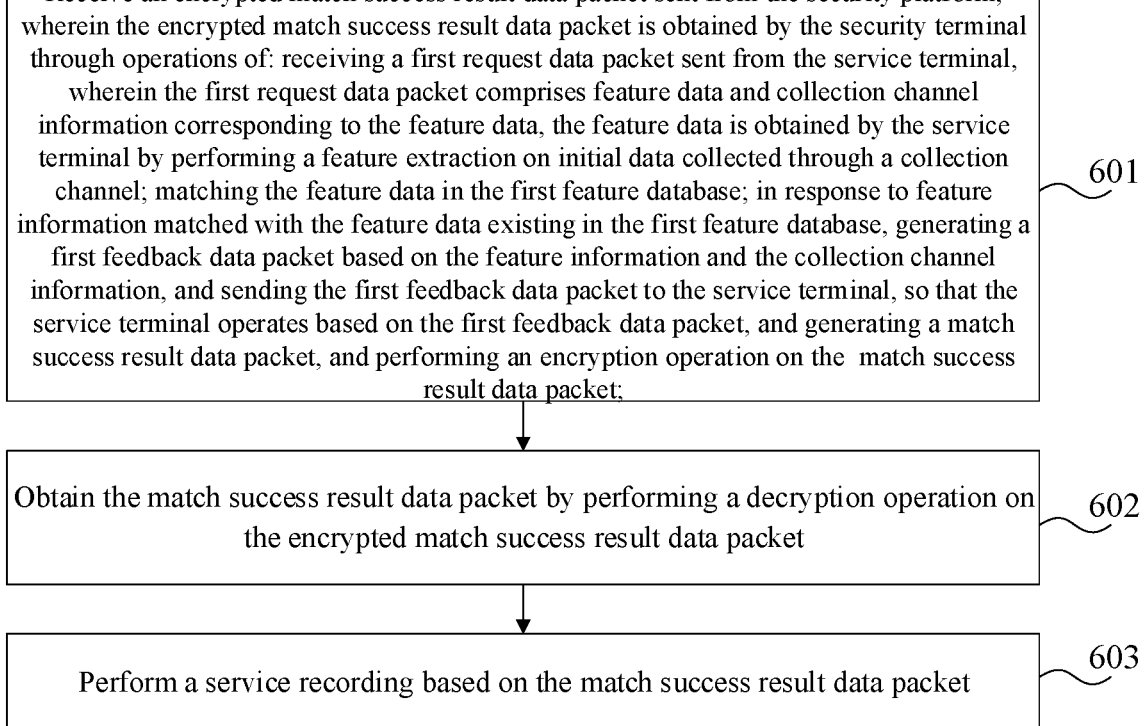

Receive an encrypted match success result data packet sent from the security platform, wherein the encrypted match success result data packet is obtained by the security terminal through operations of: receiving a first request data packet sent from the service terminal, wherein the first request data packet comprises feature data and collection channel information corresponding to the feature data, the feature data is obtained by the service terminal by performing a feature extraction on initial data collected through a collection channel; matching the feature data in the first feature database; in response to feature information matched with the feature data existing in the first feature database, generating a first feedback data packet based on the feature information and the collection channel information, and sending the first feedback data packet to the service terminal, so that the service terminal operates based on the first feedback data packet, and generating a match success result data packet, and performing an encryption operation on the match success result data packet;    601

Obtain the match success result data packet by performing a decryption operation on the encrypted match success result data packet    602

Perform a service recording based on the match success result data packet    603

FIG. 10

DATA TRANSMISSION METHOD, INTERNET OF THINGS SYSTEM, ELECTRONIC DEVICE, AND STORAGE MEDIUM

CROSS-REFERENCE TO RELATED APPLICATION

The present application claims priority to Chinese patent application No. 202210111749.8 titled "DATA TRANSMIS-SION METHOD, INTERNET OF THINGS SYSTEM, ELECTRONIC DEVICE, AND STORAGE MEDIUM", filed with the China National Intellectual Property Admin-istration on Jan. 29, 2022, the entire contents of which are incorporated herein by reference.

TECHNICAL FIELD

The present disclosure relates to the field of communica-tion technology, and in particular to a data transmission method, an Internet of Things system, an electronic device and a storage medium.

BACKGROUND

With the development of communication technology, the Internet of Things has been widely used. The Internet of Things provides an interactive basis for smart logistics, smart transportation, smart security, smart life and other fields.

Currently, when multiple service terminals in the Internet of Things communicate with servers to exchange data, each service terminal is provided with a security module hard-ware so as to ensure data security. When the service terminal sends data, the data is encrypted in the security module, and service processing is completed based on certain key data in the security module to prevent key data from being leaked. When the service terminal receives data, the data is also decrypted in the security module, and service processing related to confidential data is completed in the security module.

SUMMARY

A first aspect of the present disclosure provides a data transmission method, applied to a security platform in an Internet of Things (IoT) system, the IoT system further includes a server and a service terminal, the server is in a communication connection with the service terminal through the security platform, a first feature database is stored in the security platform, the method includes:

receiving a first request data packet sent from the service terminal, the first request data packet includes feature data and collection channel information corresponding to the feature data, the feature data is obtained by the service terminal by performing feature extraction on initial data collected through a collection channel;

matching the feature data in the first feature database;

in response to feature information matched with the feature data existing in the first feature database, gen-erating a first feedback data packet based on the feature information and the collection channel information, and sending the first feedback data packet to the service terminal, so that the service terminal operates accord-ing to the first feedback data packet; and generating a match success result data packet, performing an encryption operation on the match success result data packet, and sending an encrypted match success result data packet to the server, so that the server obtains the match success result data packet through a decryption operation, and performs a service recording according to the match success result data packet.

In some embodiments, a second feature database is stored in the server, the second feature database includes the first feature database, and an amount of feature information in the first feature database is less than the amount of feature information in the second feature database; after matching the feature data in the first feature database, the method further includes:

in response to no feature information matched with the feature data existing in the first feature database, gen-erating a second request data packet based on the feature data, the collection channel information and a match failure result;

performing an encryption operation on the second request data packet;

sending an encrypted second request data packet to the server, so that the server obtains the second request data packet through a decryption operation, and matches the feature data of the second request data packet in the second feature database.

In some embodiments, after the sending an encrypted second request data packet to the server, the method further includes:

receiving an encrypted second feedback data packet sent from the server, the encrypted second feedback data packet is obtained by the server through matching the feature data in the second feature database, generating a second feedback data packet based on a match result and the collection channel information, and encrypting the second feedback data packet;

obtaining the second feedback data packet by performing a decryption operation on the encrypted second feed-back data packet; and sending the second feedback data packet to the service terminal, so that the service terminal operates accord-ing to the second feedback data packet.

In some embodiments, the encryption operation includes encrypting using a symmetric algorithm key;

the decryption operation includes decrypting using the symmetric algorithm key.

In some embodiments, before the receiving a first request data packet sent from the service terminal, the method further includes:

sending a device authentication request to the server in response to a startup of the IoT system;

receiving an asymmetric algorithm public key sent by the server, the asymmetric algorithm public key is gener-ated by the server and sent in response to the device authentication request;

obtaining a device authentication information ciphertext by encrypting device authentication information with the asymmetric algorithm public key, the device authentication information includes a terminal identi-fication of each of service terminals connected to the security platform and a count of the terminals, as well as a platform identification of the security platform;

sending the device authentication information ciphertext to the server, so that the server obtains the device authentication information through a decryption opera-tion, and performs authentication on the security plat-form and each of the service terminals connected to the security platform based on the device authentication information; and receiving device authentication passing information sent from the server, and completing the device authentication initialization, the device authentication passing information is sent when the authentication performed by the server on the security platform and the service terminals connected to the security platform passes.

In some embodiments, after the completing the device authentication, the method further includes:

sending a key acquisition request to the server, the key acquisition request is used for obtaining a symmetric algorithm key required for encryption and decryption operations after the IoT system is started this time;

receiving a symmetric algorithm key ciphertext sent from the server, the symmetric algorithm key ciphertext is obtained by the server by generating a symmetric algorithm key, and generating a symmetric algorithm key in response to the key acquisition request, and encrypting the symmetric algorithm key with an asymmetric algorithm private key generated together with the asymmetric algorithm public key; and obtaining the symmetric algorithm key by decrypting the symmetric algorithm key ciphertext with the asymmetric algorithm public key, and completing key initialization.

In some embodiments, after the obtaining the symmetric algorithm key by decrypting the symmetric algorithm key ciphertext with the asymmetric algorithm public key, the method further includes:

replacing a stored old symmetric algorithm key with the symmetric algorithm key to complete the key initialization, the old symmetric algorithm key is the symmetric algorithm key required for encryption and decryption operations after the IoT system was last started.

In some embodiments, after completing the key initialization, the method further includes:

sending a database verification request to the server, the database verification request carries database information about the first feature database currently stored in the security platform, and the database verification request is used to request the server to verify whether the first feature database currently stored in the security platform is the latest first feature database based on the database information;

receiving verification passing information sent from the server, and completing database initialization, the verification passing information is sent when the server performs verification based on the database information and confirms that the first feature database currently stored in the security platform is the latest first feature database.

In some embodiments, after sending the database verification request to the server, the method further includes:

receiving a latest first feature database sent from the server, the latest first feature database is sent when the server performs the verification based on the database information, and confirms that the first feature database currently stored in the security platform is not the latest first feature database;

updating the first feature database currently stored in the security platform to the latest first feature database; and sending the database verification request to the server again until receiving the verification passing information from the server, and completing database initialization.

In some embodiments, before sending the database verification request to the server, the method further includes:

obtaining a first hash value by performing a hash encoding on the first feature database currently stored in the security platform, using the first hash value as the database information about the first feature database;

the sending the database verification request to the server includes:

sending the database acquisition request the server, to cause the server to verify whether the first feature database currently stored in the security platform is the latest first feature database by comparing whether a first hash value is consistent with a second hash value, the second hash value is obtained by performing a hash encoding on the first feature database currently stored in the server.

In some embodiments, a first communication protocol is used between the security platform and the server, a second communication protocol is used between the security platform and the service terminal, and the first communication protocol is different from the second communication protocol;

the method further includes:

encapsulating uplink service data to be sent to the server into an uplink service data packet through the first communication protocol, to enable the uplink service data packet to be processed by the server, and sending the uplink service data packet to the server, the uplink service data packet includes the match success result data packet and the second request data packet; and de-encapsulating, through the first communication protocol, downlink service data packet received from the server into downlink service data, to enable the downlink service data to be processed by the security platform, the downlink service data packet includes the encrypted second feedback data packet.

A second aspect of the present disclosure further provides a data transmission method, applied to a server in an Internet of Things (IoT) system, the IoT system further includes a security platform and a service terminal, the server is a communication connection with the service terminal through the security platform, and a first feature database is stored in the security platform, the method includes:

receiving an encrypted match success result data packet sent from the security platform, the encrypted match success result data packet is obtained by the security terminal through operations of: receiving a first request data packet sent from the service terminal, the first request data packet includes feature data and collection channel information corresponding to the feature data, the feature data is obtained by the service terminal by performing a feature extraction on initial data collected through a collection channel; matching the feature data in the first feature database; in response to feature information matched with the feature data existing in the first feature database, generating a first feedback data packet based on the feature information and the collection channel information, and sending the first feedback data packet to the service terminal, so that the service terminal operates based on the first feedback data packet, and generating a match success result data packet, and performing an encryption operation on the match success result data packet;

obtaining the match success result data packet by performing a decryption operation on the encrypted match success result data packet; and performing a service recording based on the match success result data packet.

In some embodiments, a second feature database is stored in the server, the second feature database includes the first feature database, and an amount of feature information in the first feature database is less than the amount of feature information in the second feature database;

receiving an encrypted second request data packet sent from the security platform, the encrypted second request data packet is obtained by: in response to no feature information matched with the feature data existing in the first feature database, generating a second request data packet by the security platform based on the feature data, the collection channel information and a match failure result, and performing an encryption operation on the second request data packet;

obtain the second request data packet by decrypting the encrypted second request data packet;

matching the feature data of the second request data packet in the second feature database;

generating a second feedback data packet based on a match result and the collection channel information, and obtaining an encrypted second feedback data packet by encrypting the second feedback data packet;

sending the encrypted second feedback data packet to the security platform, so that the security platform obtains the second feedback data packet by decrypting the encrypted second feedback data packet, and sends the second feedback data packet to the service terminal to enable the service terminal to operate according to the second feedback data packet; and performing the service recording based on the match result.

In some embodiments, before the receiving an encrypted match success result data packet sent from the security platform, the method further includes:

receiving a device authentication request sent from the security platform when the IoT system is started;

in response to the device authentication request, sending a generated asymmetric algorithm public key to the security terminal, and storing a generated asymmetric algorithm private key, so that the secure terminal obtains a device authentication information ciphertext by encrypting the device authentication information with the asymmetric algorithm public key, and sends the device authentication information ciphertext to the server, the device authentication information includes a terminal identification of each of service terminals connected to the security platform and a count of the terminals, as well as a platform identification of the security platform;

obtaining the device authentication information by decrypting the device authentication information ciphertext;

performing authentication on the security platform and each of the service terminals connected to the security platform according to the device authentication information; and sending device authentication passing information to the security platform when the authentication on the security platform and each of the service terminals connected to the security platform is passed, so that the security platform receives the device authentication passing information and completes the device authentication initialization.

In some embodiments, after the device authentication initialization is completed, the method further includes:

receiving a key acquisition request sent from the security platform, the key acquisition request is used to obtain a symmetric algorithm key required for encryption and decryption operations after the IoT system is started this time;

generating the symmetric algorithm key in response to the key acquisition request;

obtaining a symmetric algorithm key ciphertext by encrypting the symmetric algorithm key with the asymmetric algorithm private key; and sending the symmetric algorithm key ciphertext to the security platform, so that the security platform obtains the symmetric algorithm key by decrypting the symmetric algorithm key ciphertext with a stored asymmetric algorithm public key, and completes the key initialization.

In some embodiments, after the key initialization is completed, the method further includes:

receiving a database verification request sent from the security platform, the database verification request carries database information about the first feature database currently stored in the security platform, and the database verification request is used to request the server to verify whether the first feature database currently stored in the security platform is the latest first feature database based on the database information;

performing verification based on the database information;

in response to confirming that the first feature database currently stored in the security platform is the latest first feature database, sending verification passing information to the security platform, so that the security platform receives the verification passing information and completes the database initialization.

In some embodiments, after the performing verification based on the database information, the method further includes:

in response to confirming that the first feature database currently stored in the security platform is not the latest first feature database, sending the latest first feature database to the security platform, so that the security platform, when receiving the latest first feature database, replaces the first feature database currently stored with the latest first feature database; and receiving the database verification request sent from the security platform again until the verification is successful, so that the security platform receives the verification passing information from the server and completes the database initialization.

In some embodiments, the database information is a first hash value obtained by performing a hash encoding, by the security platform, on the first feature database currently stored in the security platform; before the performing verification based on the database information, the method further includes:

obtaining a second hash value by performing hash encoding on the first feature database currently stored in the server;

the performing verification based on the database information includes:

verifying whether the first feature database currently stored in the security platform is the latest first feature database by comparing whether the first hash value is consistent with the second hash value.

A third aspect of the present disclosure further provides a data transmission method, applied to a service terminal in an Internet of Things (IoT) system, the IoT system further includes a server and a security platform, the server is a communication connection with the service terminal through the security platform, and a first feature database is stored in the security platform, the method includes:

collecting initial data through a collection channel;

obtaining feature data by performing feature extraction on the initial data;

sending a first request data packet to the security platform, the first request data packet includes the feature data and collection channel information corresponding to the feature data, so that the feature data is matched by the security platform in the first feature database, in response to feature information matched with the feature data existing in the first feature database, the security platform generates a first feedback data packet according to the feature information and the collection channel information and sends the first feedback data packet to the service terminal;

receiving the first feedback data packet sent from the security platform; and operating based on the first feedback data packet.

In some embodiments, the service terminal is connected to at least one photographing device, photographing devices and collection channels are in a one-to-one correspondence, and the initial data is captured by the photographing device corresponding to the collection channel;

the operating based on the first feedback data packet includes:

generating an image with feature annotations based on the feature information in the first feedback data packet; and displaying the image.

A fourth aspect of the present disclosure further provides an Internet of Things (IoT) system, including a server, a security platform and a service terminal, the server is in a communication connection with the service terminal through the security platform, and a first feature database is stored in the security platform;

the service terminal is configured to collect initial data through a collection channel; obtain feature data by performing feature extraction on the initial data; send a first request data packet to the security platform, the first request data packet includes the feature data and collection channel information corresponding to the feature data;

the security platform is configured to: receive the first request data packet; match the feature data in the first feature database; when feature information matched with the feature data exists in the first feature database, generate a first feedback data packet based on the feature information and the collection channel information, and send the first feedback data packet to the service terminal; generate a match success result data packet, perform an encryption operation on the match success result data packet, and send an encrypted match success result data packet to the server;

the service terminal is further configured to receive the first feedback data packet; and perform operations according to the first feedback data packet;

the server is configured to: receive the encrypted match success result data packet; obtain the match success result data packet by decrypting the encrypted match success result data packet; and perform a service recording according to the match success result data packet.

In some embodiments, the security platform is in a communication connection with the server through a public network or a private network, and the security platform is in a communication connection with the service terminal through a private network.

A fifth aspect of the present disclosure further provides an electronic device, including a memory and an executable program stored on the memory, the program, when run, implements the steps of the data transmission methods described in the first aspect, the second aspect or the third aspect.

A fifth aspect of the present disclosure further provides a computer-readable storage medium storing executable programs that when run, implements the steps of the data transmission methods described in the first aspect, the second aspect or the third aspect.

The explanation is merely an overview of technical solutions of the present disclosure. In order to know about the technical means of the present disclosure more clearly and implement the solutions according to the contents of the specification, and in order to make the above-mentioned and other objects, features and advantages of the present disclosure more apparent and understandable, specific implementations of the present disclosure are set forth below.

BRIEF DESCRIPTION OF THE DRAWINGS

In order to describe technical solutions in embodiments of the present disclosure or the related art more clearly, the accompanying drawings which are used in the description of the embodiments or the related art will be briefly introduced. Apparently, the accompanying drawings in the following description illustrate some embodiments of the present disclosure, and those skilled in the art may obtain other accompanying drawings based on these accompanying drawings without paying any creative effort.

FIG. 7 is a flow chart of a device authentication initialization stage in an embodiment of the present disclosure;

FIG. 8 is a flow chart of a key initialization stage in an embodiment of the present disclosure;

FIG. 9 is a flow chart of a database initialization stage in an embodiment of the present disclosure;

FIG. 10 is a flow chart illustrating a third data transmission method according to an embodiment of the present disclosure.

DETAILED DESCRIPTION

In order to make objects, solutions and advantages of embodiments of the present disclosure clearer, a clear and thorough description for technical solutions in the embodiments of the present disclosure will be given below in conjunction with the accompanying drawings in the embodiments of the present disclosure. Apparently, the described embodiments are a part of embodiments of the present disclosure, not all the embodiments. All other embodiments obtained, based on the embodiments in the present disclosure, by those skilled in the art without paying creative effort fall within the protection scope of the present disclosure.

Unless otherwise defined, technical terms or scientific terms used herein shall have the usual meaning understood by those skilled in the art to which this disclosure belongs. Words such as "first" and "second" used in the present disclosure do not indicate any order, quantity or importance, but are only used to distinguish different components. Likewise, similar words such as "a/an", "one" or "the" do not indicate a quantitative limitation, but indicates "at least one". Words such as "including" or "comprising" mean that the element or object before the word includes the elements or objects listed after the word and their equivalents, without excluding other elements or objects. Words such as "connected" or "linked" are not limited to physical or mechanical connections, but may include electrical connections that are ether direct or indirect. Orientation words such as "upper", "lower", "left" and "right" are only used to indicate the relative positional relationship based on the drawings. When the absolute position of the described object changes, the relative positional relationship may also change accordingly.

Problems caused by the existing technology are as follows:

1. Each user-oriented IoT service terminal must have an independent security module hardware, which will increase the hardware cost, including the cost of the hardware itself, as well as the cost of subsequent hardware maintenance and replacement;

2. Since there are a large number of service terminals, storing confidential key service data in the security module of each service terminal will increase the risk of confidential data being leaked and tampered with.

Figure 1:
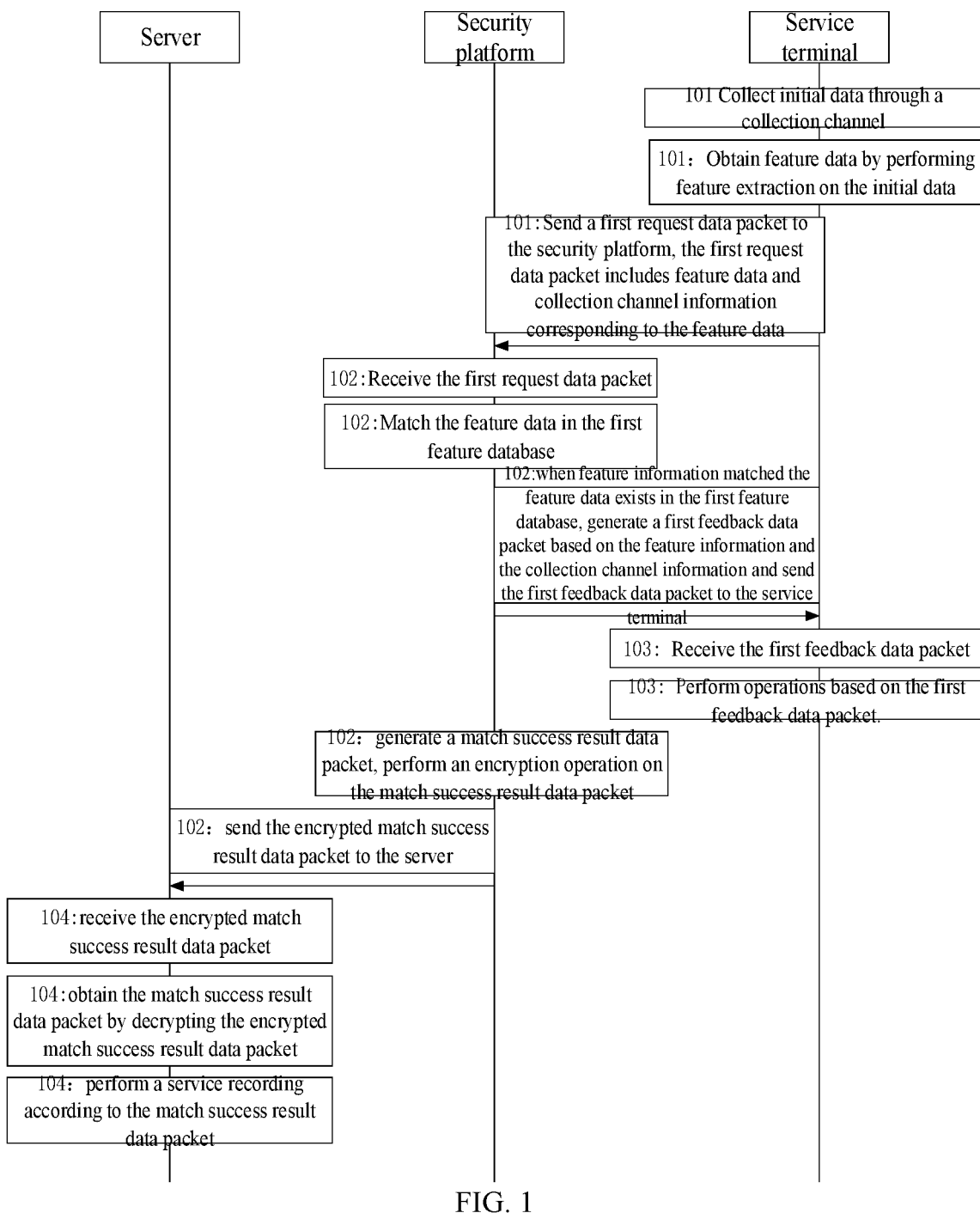
FIG. 1 is a flow chart illustrating a first data transmission method according to an embodiment of the present disclosure.
Figure 2:
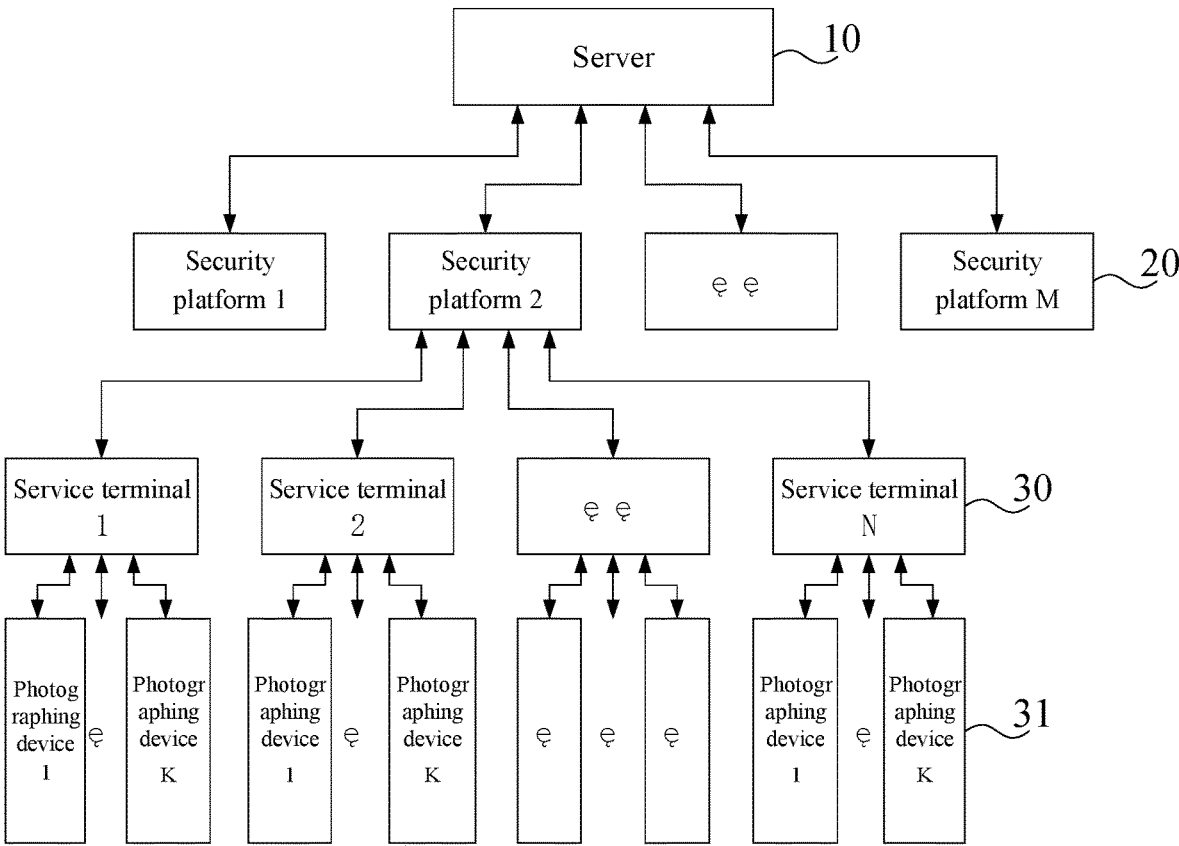
FIG. 2 is a block diagram illustrating an Internet of Things system according to an embodiment of the present disclosure.

Reference is made to FIG. 1, which is a flow chart illustrating a data transmission method according to an embodiment of the present disclosure. The data transmission method is applied to an Internet of Things system 100 as shown in FIG. 2, including a server 10, a security platform 20 and a service terminal 30. The server 10 is in a communication connection with the service terminal 30 through the security platform 20, and the security platform 20 is stored with a first feature database.

Among them, the service terminal 30 is a terminal device directly facing users in the Internet of Things service, and is responsible for functions such as information collection (for example, collecting face information through a camera), information processing, uplink and downlink communication and interaction.

The security platform 20 includes a security terminal device equipped with relevant security software and hardware at the edge of the Internet of Things, and forms a secure local area network with several service terminals in the same area. The security platform 20 is responsible for interacting the encrypted data with the server via an uplink public network or a private network, and interacting the service data with the service terminal via the downlink private network, and implementing the security processing such as data encryption and decryption and key service processing inside the platform. The first feature database is the confidential data required by the security platform for key service processing, and can be used for feature identification and comparison of user information. The first feature database is related to the user information, once it is leaked or tampered with, the security of the Internet of Things system will be damaged.

The server 10 may be a physical server, a cloud server based on physical server resources, a single server, or a server cluster, which is not specifically limited in this embodiment of the disclosure. The server is responsible for operations such as analyzing, monitoring, storage all the service data, and responsible for supervising all edge devices (including security platforms and service terminals) connected to the server.

In the embodiment of the present disclosure, one security platform and at least one service terminal may form a security sub-net in the Internet of Things, and the server can manage multiple such security sub-nets.

In the embodiment of the present disclosure, the IoT system can implement IoT services such as collection, matching, and recording of user-related feature data, and can also implement encryption and decryption of data transmitted with the server during the service process, and perform related initialization before IoT services. It can be understood that in practical applications, the services implemented by the IoT system are not limited to the above contents, and can be other services as long as they require encryption and decryption of transmitted data and need to be processed based on confidential key data.

Referring to FIG. 1, the method includes steps described below.

At step 101, the service terminal collects initial data through a collection channel; obtains feature data by performing feature extraction on the initial data; sends a first request data packet to the security platform. The first request data packet includes feature data and collection channel information corresponding to the feature data.

Referring to FIG. 2, the service terminal 30 may be connected to at least one photographing device 31. The photographing devices 31 and the collection channels are in a one-to-one correspondence, and the initial data is captured by the photographing device 31 corresponding to the collection channel.

Each service terminal may have at least one collection channel for collecting data. For example, one service terminal may be deployed with multiple photographing devices, and each photographing device forms a collection channel of the service terminal. The service terminal may use various photographing devices to collect private initial data related to the user such as face images, fingerprint images, palmprint images, and work badge images.

An IoT service is initiated by the service terminal, and the service terminal may collect initial data through the collection channel, where the initial data refers to data collected by the service terminal that has not been analyzed and processed. Then, the service terminal may perform feature extraction on the initial data to obtain user-related features in the initial data, such as facial features, fingerprint features, palmprint features, content of specific locations on the work badge, etc. Next, the service terminal may package the feature data and corresponding collection channel information into a first request data packet, and then send the first request data packet to the security platform.

At step 102, the security platform performs operation of: receiving the first request data packet; matching the feature data in the first feature database; when feature information matched with the feature data exists in the first feature database, generating a first feedback data packet based on the feature information and the collection channel information and sending the first feedback data packet to the service terminal; generating a match success result data packet, performing an encryption operation on the match success result data packet, and sending the encrypted match success result data packet to the server.

After receiving the first request data packet sent by the service terminal, the security platform may obtain the feature data through analysis, and then match the feature data in the local first feature database of the security platform to find whether feature information matched with the feature data exists in the first feature database. If there is feature information matched with the feature data, it means that information corresponding to the feature data is recorded in the security platform, and the matching is successful. Otherwise, it means that the information corresponding to the feature data is not recorded in the security platform, and the matching fails.

In the case that the matching is successful, on the one hand, the security platform may package the matched feature information in the first feature database and the collection channel information into a first feedback data packet, and send the first feedback data packet to the service terminal. On the other hand, the security platform may generate a match success result packet, and the match success result needs to be sent to the server. Therefore, in order to ensure data security, the security platform may encrypt the match success result packet, and then send the encrypted match success result packet to the server.

At step 103, the service terminal receives the first feedback data packet and performs operations based on the first feedback data packet.

After receiving the first feedback data packet, the service terminal may analyze and obtain the feature information matched with the feature data and the collection channel information corresponding to the special data, so that relevant operations such as annotating, displaying the feature information on the collection channel may be made.

At step 104, the server performs operations of: receiving the encrypted match success result data packet; obtaining the match success result data packet by decrypting the encrypted match success result data packet; and performing a service recording according to the match success result data packet.

After receiving the encrypted match success result data packet, the server first decrypts the encrypted match success result data packet to obtain the match success result data packet, parses and obtains the match success result of the feature data, and then the server can record the service data according to the matching success result, so as to record the status of this service processing. In a specific application, the server may record the match success result as well its corresponding information such as the security platform identification, the service terminal identification, the collection channel information, timestamp, which are not limited in the embodiments of the present disclosure.

In practical applications, the security platform identification, the service terminal identification and the collection channel information should not be repeated in the IoT system.

In the embodiment of the present disclosure, through the edge access method, the access of multiple IoT edge service terminals may be completed based on one edge security platform equipment, and an edge security sub-net may be built, so as to manage multiple accessed service terminals and supervise the uplink and downlink service data of the service terminals and the server through the security platform. In this way, the isolation between edge users and the server is achieved, functions such as security protection of transmission data are implemented, and the data security in the IoT system is improved. The security module hardware with complex security mechanisms may be eliminated inside the service terminal, which reduces the cost of a single terminal and the complexity of the system. When users choose a large number of edge service terminals to access the system, the cost can be significantly reduced, Moreover, confidential key service data such as databases that are originally stored in the edge service terminals are transferred to the edge security platform for storage, reducing the risk of confidential data being leaked and tampered with.

The steps executed by the security platform, the server and the service terminal will be described in detail below.

Figure 3:
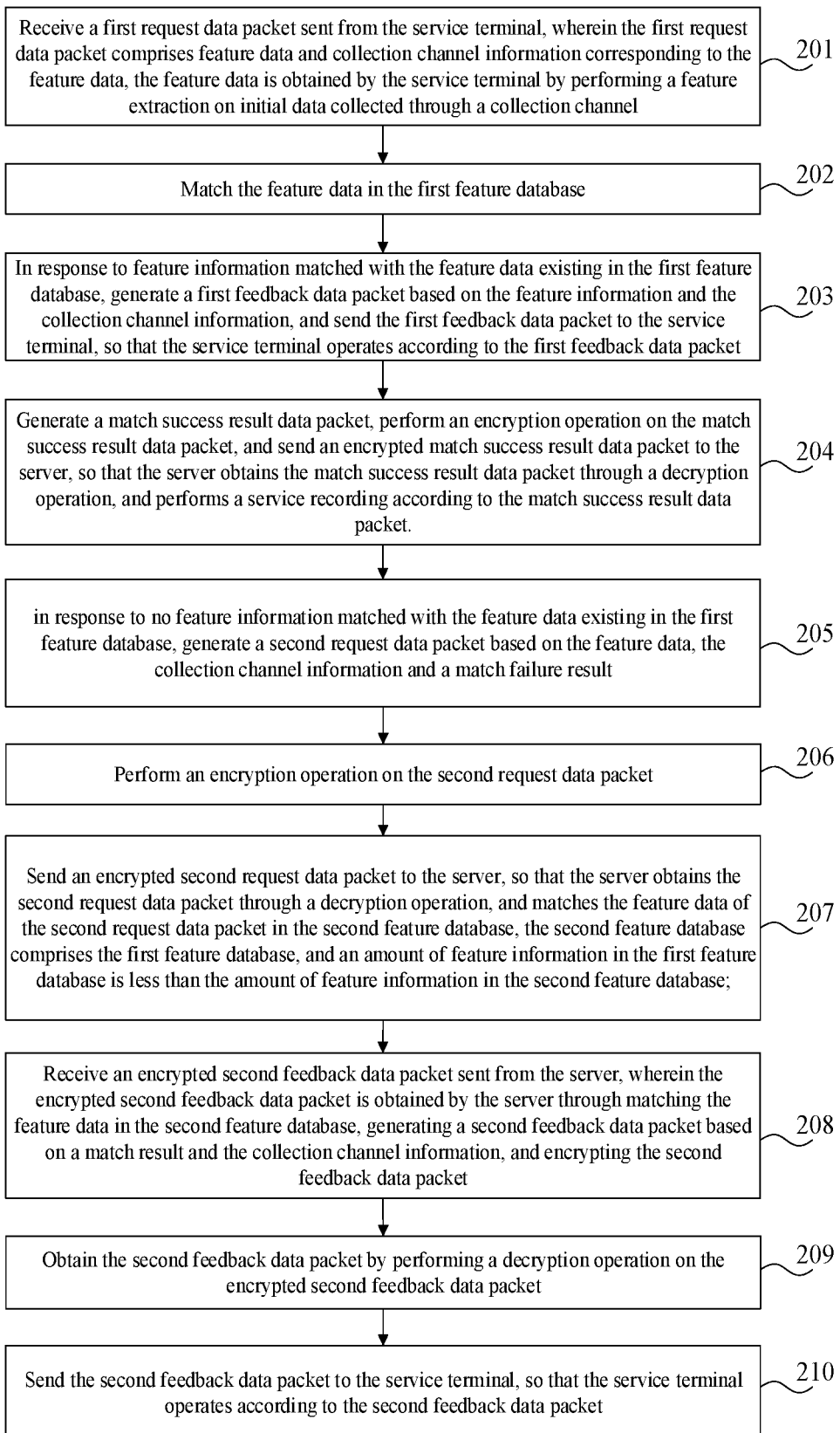
FIG. 3 is a flow chart illustrating a second data transmission method according to an embodiment of the present disclosure.

Reference is made to FIG. 3, which is a flow chart illustrating a data transmission method according to an embodiment of the present disclosure. The data transmission method is applied to a security platform in the IoT system. The IoT system further includes a server and a service terminal, and the server is in communication connection with the service terminal through the security platform. The first feature database is stored in the security platform.

As shown in FIG. 3, the method includes steps described below.

At step 201, the first request data packet sent from the service terminal is received. The first request data packet includes the feature data and the collection channel information corresponding to the feature data. The feature data is obtained by performing, by the service terminal, feature extraction on the initial data collected through the collection channel.

At step 202, the feature data is matched in the first feature database.

At step 203, if feature information matched with the feature data exists in the first feature database, the first feedback data packet is generated based on the feature information and the collection channel information, and the first feedback data packet is sent to the service terminal, so that the service terminal can perform operations based on the first feedback data package.

At step 204, the match success result data packet is generated, an encryption operation is performed on the match success result data packet, and the encrypted match success result data packet is sent to the server, so that the server can obtain the match success result data packet through a decryption operation, and service recording is performed according to the match success result data packet.

The implementation of steps 201 to 204 may refer to steps 101 to 104 in the above embodiment, which will not be repeated in this embodiment.

At step 205, if there is no feature information matched with the feature data in the first feature database, a second request data packet is generated based on the feature data, the collection channel information and a match failure result.

After receiving the first request data packet sent by the service terminal, the security platform may obtain the feature data through analysis, and then match the feature data in the local first feature database of the security platform to find whether feature information matched with the feature data exists in the first feature database. If there is feature information matched with the feature data, it means that information corresponding to the feature data is recorded in the security platform, and the matching is successful. Otherwise, it means that the information corresponding to the feature data is not recorded in the security platform, and the matching fails.

In the case that the matching fails, that is, there is no feature information matched with the feature data in the local feature database of the security platform, the security platform needs to send the feature data to the server, so as to further search the local feature database of the server to find whether there is feature information matched with the feature data in the local feature database of the server. Therefore, the security platform may package the feature data, the collection channel information, and the match failure result into a second request data packet, and send the second request data packet to the server through subsequent steps.

In this embodiment of the present disclosure, the local feature database of a security platform only includes feature information registered in the area under the jurisdiction of this security platform, while the local feature database of the server includes feature information in the areas under the jurisdiction of all security platforms managed by the server. Therefore, if the security platform fails to match the feature data locally, it needs to be further matched by the server.

At step 206, an encryption operation is performed on the second request data packet.

Before sending the second request data packet to the server, the security platform may encrypt the second request data packet to obtain the encrypted second request data packet, thereby protecting the security of the data in the second request data packet.

At step 207, the encrypted second request data packet is sent to the server, so that the server decrypts it through a decryption operation to obtain the second request data packet, and matches the feature data in the second request data packet in the second feature database, where the second feature database is stored in the server, the second feature database includes the first feature database, and the amount of feature information in the first feature database is less than the amount of feature information in the second feature database.

The second feature database in the server may include second feature databases of all managed security platforms.

After the encrypted second request data packet is sent to the server by the security platform, the server first decrypts the encrypted second request data packet to obtain the second request data packet, and then parses the second request data packet to obtain the feature data, and then matches the feature data in the local second feature database of the server to find whether there is feature information matched with the feature data in the second feature database. If so, it means that information corresponding to the feature data is recorded in the server, the feature data is successfully matched. Otherwise, it means that no information corresponding to the feature data is recorded in the server and the matching fails.

At step 208, an encrypted second feedback data packet sent from the server is received, and the encrypted second feedback data packet is obtained by encrypting a second feedback data packet that is generated, based on the match result and collection channel information, by the server after matching the feature data in the second feature database.

No matter whether the matching in the server succeeds or fails, the match result needs to be fed back to the service terminal through the security platform. Therefore, the server may package the match result and the collection channel information into the second feedback data packet, encrypt the second feedback data packet to obtain the encrypted second feedback data packet, and then send the encrypted second feedback data packet to the security platform.

In addition, after sending the second feedback data packet, the server also needs to record the service data based on the match result to record the status of this service processing.

At step 209, the second feedback data packet is obtained by decrypting the encrypted second feedback data packet.

After receiving the encrypted second feedback data packet sent by the server, the security platform first performs a decryption operation to obtain the second feedback data packet.

At step 210, the second feedback data packet is sent to the service terminal, so that the service terminal operates according to the second feedback data packet.

After the second feedback data packet is obtained through decryption, the security platform may directly send the second feedback data packet to the service terminal to feed back the match result to the service terminal. After receiving the second feedback data packet, the service terminal may analyze the second feedback data packet to obtain the match result of the feature data and the collection channel information corresponding to the feature data, and then the service terminal may perform operations based on the match result and the collection channel information.

If the matching in the server succeeds, the match result will include feature information matched with the feature data in the second feature database, then the service terminal may perform related operations on the feature information through a display device corresponding to the collection channel indicated by the collection channel information, for example marking, displaying the feature information.

If the matching in the server fails, the match result will include information indicating that the feature data fails to be matched. Then, the service terminal may perform related operations through a display device corresponding to the collection channel indicated by the collection channel information, for example annotating, displaying information about match failure. Alternatively, the service terminal may also prompt for manual intervention, or the service terminal may not perform any operation.

In addition, in some embodiments, optionally, various encryption operations during the IoT service processing may specifically include encrypting through a symmetric algorithm key, and various decryption operations during the IoT service processing may specifically include decrypting through a symmetric algorithm key.

During the IoT service processing process, the security platform may symmetrically encrypt the uplink service data packet required to be sent to the server, and symmetrically decrypt the downlink service data packet received from the server, so that the security platform can protect the uplink/downlink service data between the server and the service terminal, improving the security of uplink/downlink service data.

The uplink service data packet may include the above-mentioned match success result data packet and the second request data packet. The downlink service data packet may include the above-mentioned encrypted second feedback data packet.

Figure 4:
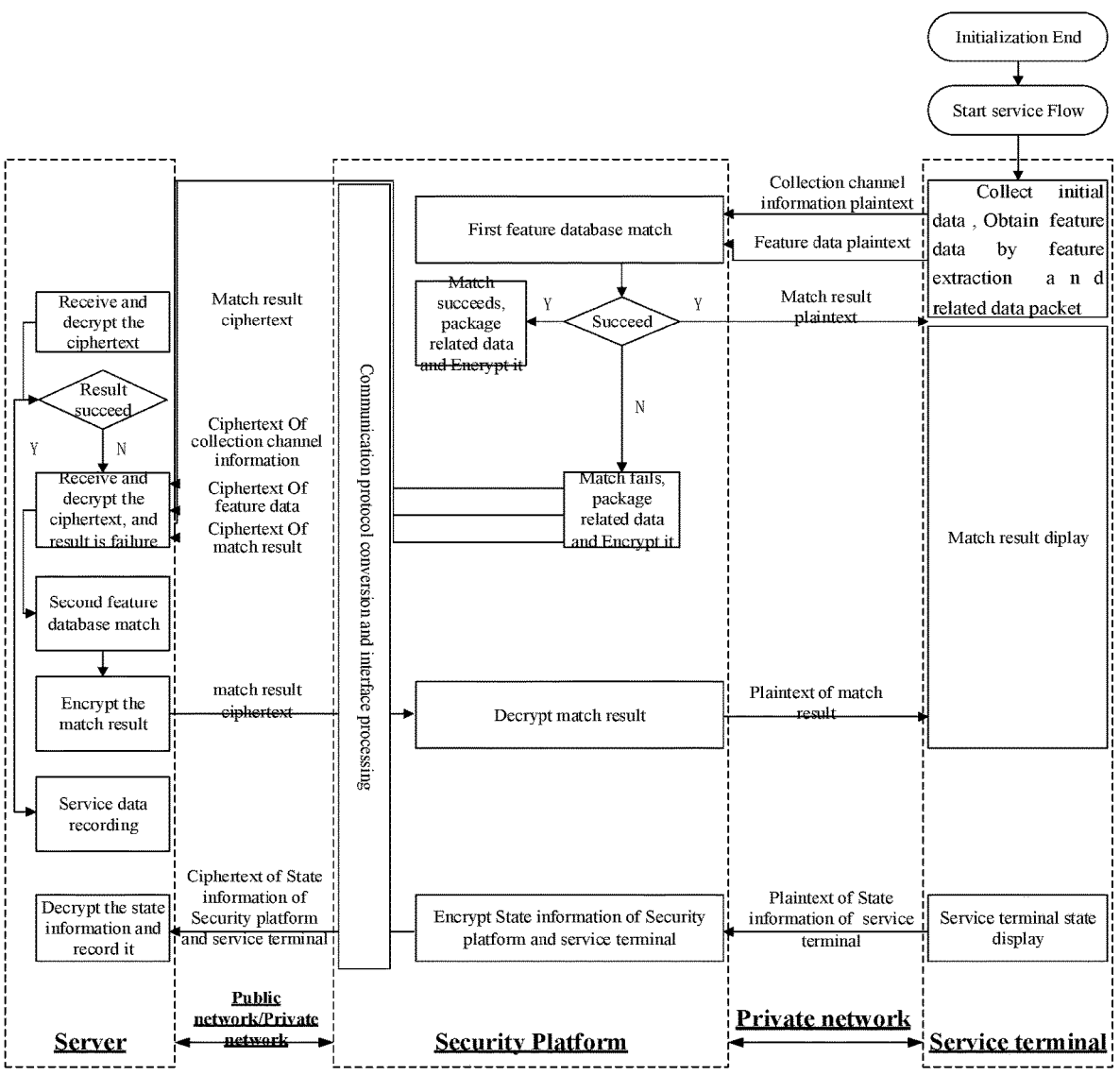
FIG. 4 is a service processing flow chart according to an embodiment of the present disclosure.

Referring to FIG. 4, when the service processing is performed, the security platform may record and collect statistics on the working status of the security platform and the service terminal, and transmit them back to the server in real time, so that the server can monitor the working status in real time and record logs.

The above is a service processing process of the IoT system based on the security platform. In practical applications, due to the introduction of the security platform, referring to FIG. 5, before entering the service processing stage, the IoT system needs to be initialized based on the security platform to prepare for the service processing.

Figure 5:
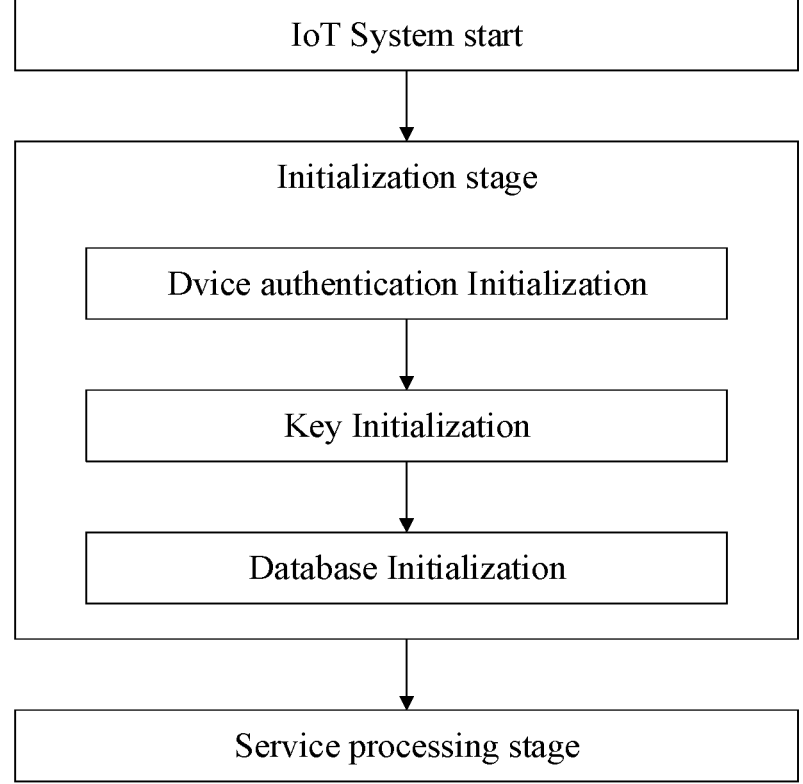
FIG. 5 is a flow chart illustrating an initialization stage and a service processing stage according to an embodiment of the present disclosure.

In an embodiment of the present disclosure, referring to FIG. 5, an initialization stage of the IoT system may include device authentication initialization, key initialization and database initialization in sequence.

Among them, the device authentication initialization process is initiated by the security platform, during the device authentication initialization stage, the server may perform a validity authentication on the accessed security platforms and service terminals; the key initialization process is also initiated by the security platform, during the key initialization stage, the security platform needs to obtain from the server the symmetric algorithm key required to encrypt and decrypt the transmission data after the system is started this time; the database initialization process is still initiated by the security platform, during the database initialization stage, the security platform needs to obtain the latest version of the first feature database corresponding to the area under its jurisdiction from the server.

The initialization stage of the IoT system will be introduced below with reference to the specific initialization process shown in FIG. 6.

FIG. 7 is a flow chart of a device authentication initialization stage in an embodiment of the present disclosure. Referring to FIG. 7, before performing the service processing, that is, before the above-mentioned step 201, the method may further include steps described below.

At step 301, a device authentication request is sent to the server when the IoT system starts.

Figure 6:
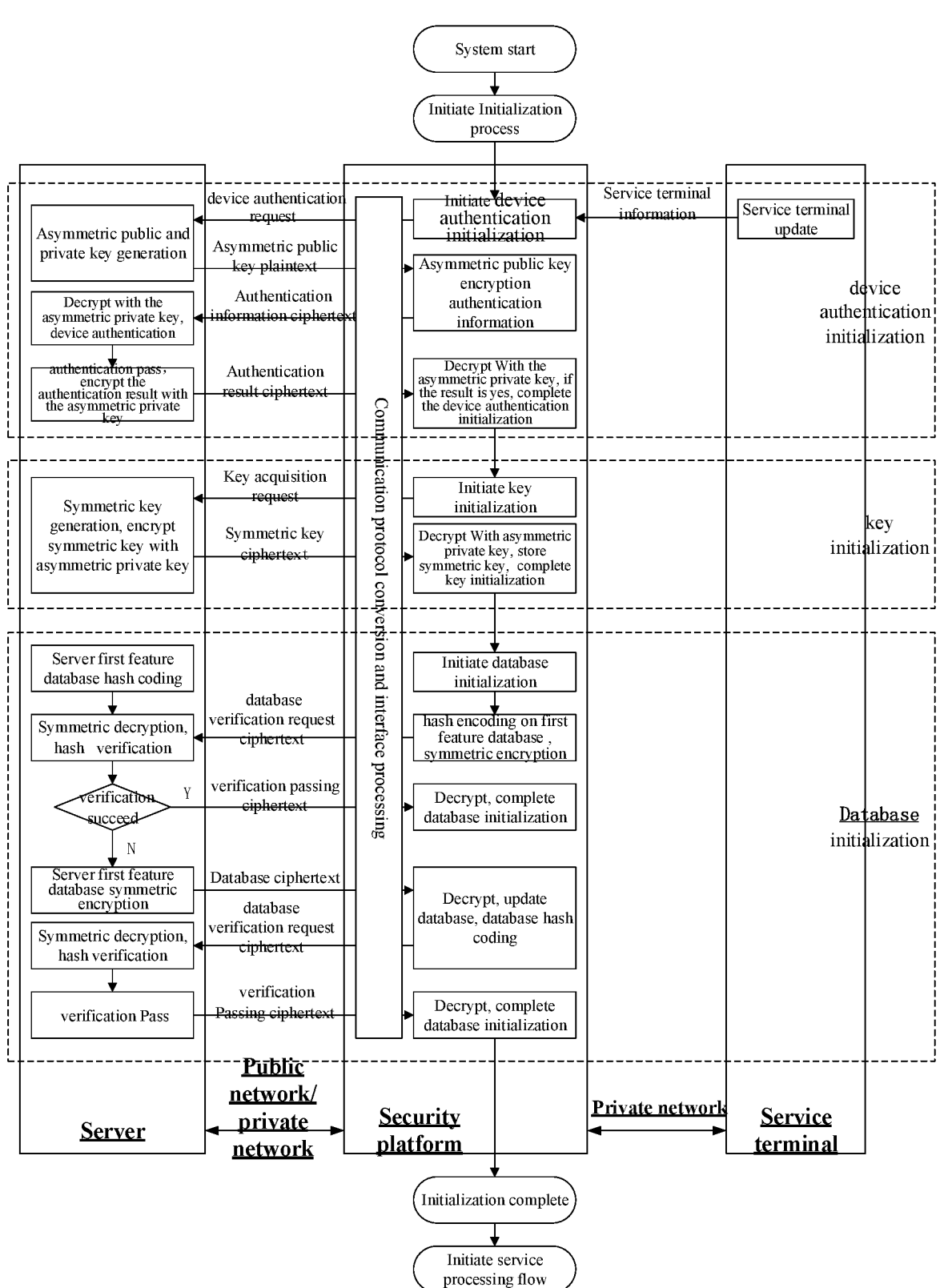
FIG. 6 is a specific initialization flow chart according to an embodiment of the present disclosure.

Referring to FIG. 6, after the server, the security platform and the service terminal in the IoT are all powered on and the connection is established, the IoT system starts. Next, the security platform may obtain the accessed service terminal information and initiate a process of device authentication initialization, so as to send a device authentication request to the server.

The server may authenticate the accessed security platform and service terminal by means of certificate authentication. Accordingly, the device authentication request may include certificate information of the security platform and the service terminal.

At step 302, an asymmetric algorithm public key sent from the server is received, where the asymmetric algorithm public key is generated by the server, and is sent in response to the device authentication request.

Referring to FIG. 6, in response to receiving the device authentication request sent by the security platform, the server may send the generated asymmetric algorithm public key to the security platform. The security platform may use the asymmetric algorithm public key to encrypt subsequent device authentication information required to be sent to the server, and use the asymmetric algorithm public key to decrypt the symmetric algorithm key ciphertext received from the server.

The server may generate an asymmetric algorithm public key and an asymmetric algorithm private key together after being powered on and before receiving the device authentication request. Alternatively, the server may generate an asymmetric algorithm public key and an asymmetric algorithm private key together after receiving the device authentication request. In practical applications, data encrypted by one party using the asymmetric algorithm public key may be decrypted by the other party using the asymmetric algorithm private key. Conversely, data encrypted by one party using the asymmetric algorithm private key may be decrypted by the other party using the asymmetric algorithm public key. In the embodiment of the present disclosure, the asymmetric algorithm private key may be retained and stored locally on the server, and the asymmetric algorithm public key is sent by the server to the security platform for storage.

The asymmetric algorithm public key and the asymmetric algorithm private key need to be updated each time the IoT system starts, so that the asymmetric algorithm public-private key pairs used after each startup of the IoT system are different. Therefore, even if the asymmetric algorithm public key and the asymmetric algorithm private key used last time are cracked, it will not affect the initialization process and service processing process after this startup, thereby improving the data security. In the embodiment of the present disclosure, the initialization process of the asymmetric algorithm public-private key pair may be performed during the device authentication initialization stage.

At step 303, the device authentication information is encrypted using the asymmetric algorithm public key to obtain the device authentication information ciphertext. The device authentication information includes a terminal identification of each service terminal connected to the security platform and a count of the terminals, as well as a platform identification of the security platform.

Referring to FIG. 6, once the asymmetric algorithm public key sent by the server is received, the security platform may perform asymmetrical encryption on the device authentication information of the security platform and the accessed service terminals using the asymmetric algorithm public key, and obtain the device authentication information ciphertext.

In addition to the terminal identification of each service terminal connected to the security platform, the count of the terminals and the platform identification of the security platform, the device authentication information may further include information such as timestamp, which is not specifically limited in the embodiment of the present disclosure.

At step 304, the cipher text of the device authentication information is sent to the server, so that the server can obtain the device authentication information through a decryption operation, and authenticate the security platform and each service terminal connected to the security platform based on the device authentication information.

Referring to FIG. 6, the security platform can then send the device authentication information ciphertext to the server, so that the server obtains the device authentication information by decrypting the device authentication information ciphertext using the asymmetric algorithm private key. Then, the validity authentication is performed on the security platform and the service terminals connected to the security platform by comparing the device authentication information with the certificate information of the platform and service terminals stored in the server and checking whether they are consistent with each other. If they are consistent, the authentication is passed. Otherwise, the authentication is not passed and manual intervention is required.

At step 305, device authentication passing information sent from the server is received, and the device authentication initialization is completed. The device authentication passing information is sent by the server when the security platform and the service terminals connected to the security platform pass the authentication.

Referring to FIG. 6, when the security platform and the service terminals pass the authentication of the server, the server may send the device authentication pass information to the security platform. After receiving the device authentication pass information, the security platform can confirm that the authentication has been passed. At this point, the device authentication initialization is completed, and the device authentication initialization stage ends.

FIG. 8 is a flow chart of a key initialization stage in an embodiment of the present disclosure. Referring to FIG. 8, after the above step 305, the method may further include steps described below.

At step 401, a key acquisition request is sent to the server, where the key acquisition request is used for obtaining the symmetric algorithm key required for encryption and decryption operations after the IoT system is started this time.

Referring to FIG. 6, after completing the device authentication initialization, the security platform may initiate a key initialization process and send a key acquisition request to the server.

The key acquisition request is specifically used for obtaining the symmetric algorithm key required for encryption and decryption of the transmission data during the service processing after the IoT system is started this time.

At step 402, the symmetric algorithm key ciphertext sent from the server is received, where the symmetric algorithm key ciphertext is obtained by the server through generating the symmetric algorithm key and encrypting the symmetric algorithm key using the asymmetric algorithm private key generated together with asymmetric algorithm public key in response to the key acquisition request for generating the symmetric algorithm key.

Referring to FIG. 6, in response to receiving the key acquisition request sent by the security platform, the server may send the generated symmetric algorithm key to the security platform. Both the security platform and the server can use this symmetric algorithm key to encrypt and decrypt the service data to be transmitted between them.

The server may generate the symmetric algorithm key after being powered on and before receiving the key acquisition request. Alternatively, the server may generate the symmetric algorithm key in response to the key acquisition request after receiving the key acquisition request. In practical applications, data encrypted by one party using the symmetric algorithm key may be decrypted by the other party using the symmetric algorithm key. Conversely, data encrypted by one party using the symmetric algorithm key may be decrypted by the other party using the symmetric algorithm key.

In the embodiment of the present disclosure, a copy of the symmetric algorithm key may be retained and stored locally on the server, and a copy of the symmetric algorithm key may be sent from the server to the security platform for storage. In this way, during the service processing process, the security platform may use the symmetric algorithm key to encrypt the uplink service data required to be sent to the server, and decrypt the downlink service data received from the server. Accordingly, the server may use the symmetric algorithm key to decrypt the uplink service data received from the security platform, and use the symmetric algorithm key to encrypt the downlink service data required to be sent to the security platform.

At step 403, the symmetric algorithm key is obtained by decrypting the symmetric algorithm key ciphertext with the asymmetric algorithm public key, and the key initialization is completed.

Referring to FIG. 6, after receiving the symmetric algorithm key ciphertext, the security platform may decrypt the symmetric algorithm key ciphertext using the asymmetric algorithm public key, thereby obtaining the symmetric algorithm key required for encryption and decryption of service data in subsequent service processing. At this point, the key initialization is completed, and the key initialization stage ends.

In practical applications, when the IoT system is initialized after the first startup, the security platform does not have old symmetric algorithm key used last time. Therefore, when the security platform obtains the symmetric algorithm key for the first time, the key initialization is completed. However, when the IoT system is initialized after being started for the second and subsequent times, the security platform already has the old symmetric algorithm key used last time. Therefore, when the security platform obtains the symmetric algorithm key for the second and subsequent times, it is also necessary to replace the old symmetric algorithm key to complete the key initialization, thereby releasing the storage resources of the security platform.

Accordingly, when the IoT system is initialized after the second and subsequent startup, after the above step in which the symmetric algorithm key is obtained by decrypting the symmetric algorithm key ciphertext using the asymmetric algorithm public key, the security platform may also perform the step described below.

The stored old symmetric algorithm key is replaced with the symmetric algorithm key (obtained this time) to complete the key initialization. The old symmetric algorithm key is the symmetric algorithm key required for encryption and decryption operations after the IoT system was last started.

In the embodiment of the present disclosure, when the security platform acquires from the server the symmetric algorithm key required for encrypting and decrypting the service data in the subsequent service processing, the symmetric algorithm key may be encrypted by the server using the asymmetric algorithm key, and then sent to the security platform, thereby improving the security of the symmetric algorithm key, and further improving the security of subsequent service data transmitted.

FIG. 9 is a flow chart of a database initialization stage according to an embodiment of the present disclosure. Referring to FIG. 9, after the above step 403, the method may also include steps described below.

At step 501, a database verification request is sent to the server, where the database verification request carries database information about the first feature database currently stored by the security platform, and the database verification request is used to request the server to verify whether the first feature database currently stored in the security platform is the latest first feature database based on the database information.

Referring to FIG. 6, after the key initialization is completed, the security platform may initiate a database initialization process and send a database verification request to the server.

In practical applications, when the IoT system is initialized after the first startup, there is no first feature database in the security platform. Therefore, the database verification request is equivalent to a database acquisition request, and can be used to obtain the first feature database. Optionally, when no first feature database is stored in the security platform, the database information may also exist, but the database information may indicate that the first feature database is an empty database. However, when the IoT system is initialized after the second and subsequent startup, the first feature database already exists in the security platform. Accordingly, the database verification request is used to request the server to verify whether the first feature database currently stored by the security platform is the latest first feature database.

In the embodiment of the present disclosure, the feature information may be updated on the server side, that is, by updating the local second feature database of the server. The server maintains the first feature databases corresponding to various security platforms, and the various security platforms can obtain the latest first feature database required by themselves during the initialization phase.

At step 502, verification passing information sent from the server is received, and the database initialization is completed. The verification passing information is sent by the server when the server confirms, after performing verification based on the database information, that the first feature database currently stored in the security platform is the latest first feature database.

Referring to FIG. 6, in response to receiving the database verification request sent by the security platform, the server performs verification based on the database information carried in the database verification request. If the database information in the database verification request is consistent with the database information of the first feature database of the security platform maintained locally by the server, it means that the first feature database currently stored by the security platform is the latest first feature database. If the database information in the database verification request is not consistent with the database information of the first feature database of the security platform maintained locally by the server, it means that the first feature database currently stored by the security platform is not the latest first feature database.

When confirming that the first feature database currently stored by the security platform is the latest first feature database, the server may send the verification pass information to the security platform. After receiving the verification pass information, the security platform may confirm that the verification has passed. At this point, the database initialization is completed, and the database initialization stage ends, thus the entire initialization stage ends.

At step 503, a latest first feature database sent by the server is received. When the server performs the verification based on the database information, and confirms that the first feature database currently stored in the security platform is not the latest first feature database, a latest first feature database is sent.

Referring to FIG. 6, when the server confirms that the first feature database currently stored in the security platform is not the latest first feature database, the server may send a latest first feature database to the security platform, so that the security platform updates the local first feature database.

At step 504, the first feature database currently stored in the security platform is update as the latest first feature database.

Referring to FIG. 6, in response to receiving the latest first feature database sent by the server, the security platform replaces the current first feature database stored locally in the security platform with the latest first feature database, thereby updating a local first feature database in the security platform.

At step 505, a database verification request is sent to the server again until the verification passing information is received from the server to complete the database initialization.

Referring to FIG. 6, in the embodiment of the present disclosure, the server needs to confirm whether the security platform has been updated to the latest first feature database to ensure that subsequent service processing can proceed smoothly. Therefore, after completing the update of the local first feature database, the security platform needs to send a database verification request to the server again. The database verification request sent at this time carries the database information of the first feature database stored locally in the security platform at this time, that is, the database information of the latest first feature database at this moment. The server needs to continue to verify to confirm whether the first feature database in the security platform is consistent with that in the server. If they are consistent with each other, the verification is successful, and the server sends the verification passing information to the security platform. If they are inconsistent, which may mean that the first feature database has been updated on the server side, or the first feature database on the security platform side has been tampered with, then the verification fails, and the server will continue to send the latest local first feature database of the server to the security platform, until the verification of the server is successful. Then, the security platform receives the verification passing information from the server, the database initialization is completed, and the database initialization stage ends, thus the entire initialization stage ends.

Furthermore, in some embodiments, optionally, as shown in FIG. 6, before the above step of sending a database verification request to the server, the security platform may also perform steps below.

A first hash value is obtained by performing a hash encoding on the first feature database currently stored in the security platform, and the first hash value is used as the database information of the first feature database.

Accordingly, the above step, in which a database verification request is sent to the server, specifically includes:

sending the database acquisition request the server, to cause the server to verify whether the first feature database currently stored in the security platform is the latest first feature database by comparing whether a first hash value is consistent with a second hash value, where the second hash value is obtained by performing hash encoding on the first feature database currently stored in the server.

The security platform may load the local first feature database into the memory, then obtain the first hash value by performing hash encoding on the local first feature database, and use the first hash value as the database information of the first feature database in the security platform. Correspondingly, the server may also obtain the second hash value by performing hash encoding on the current first feature database stored locally in the server, and use the second hash value as the current database information in the server corresponding to the first feature database of the security platform. Then, the server may determine whether the first feature database in the security platform is the latest first feature database by comparing whether the first hash value is consistent with the second hash value. If the hash values are consistent, it is determined that the first feature database in the security platform is the latest first feature database; if the hash values are inconsistent, it is determined that the first feature database in the security platform is not the latest first feature database.

For solutions using the version number as the database information, assuming that the first feature database obtained by the security platform after the last system startup is tampered with, and the server has not updated the database, then when the database is initialized after this system startup, since the version number of the tampered first feature database has not changed, the server will think that the first feature database of the security platform at this time is still the latest version and can continue to be used. However, in fact, the local first feature database of the security platform has been tampered with, leading to errors, data leakage and other problems in the service processing process after the system is started.

On the contrary, in this embodiment of the present disclosure, the hash value of the database may be used as the database information. Since the hash encoding is enabled to not lose the expressive ability of the original data as soon as possible, the hash value obtained by hash encoding can reflect the integrity of the encoded data. Therefore, compared with the solution using the version number as the database information, the solution using the hash value as the database information can not only confirm whether the local first feature database of the current security platform is the latest version, but also can confirm whether the local first feature database of the security platform has been tampered with. Therefore, the security of key service data is further improved, thereby improving the security of the entire IoT system.

In addition, in this embodiment of the present disclosure, the security platform may communicate with the server through the public network or a private network, and communicate with the service terminal through a private network. Therefore, the communication between the security platform and the server uses a first communication protocol based on the public network or the private network, and the communication between the security platform and the service terminal uses a second communication protocol based on the private network, and the first communication protocol is different from the second communication protocol.

Accordingly, referring to FIG. 6, the security platform may also perform steps described below.

Through the first communication protocol, the uplink service data to be sent to the server is encapsulated into an uplink service data packet that can be processed by the server, and the uplink service data packet is sent to the server, where the uplink service data packet may include the above-mentioned match success result data packet and the second request data packet.

Through the first communication protocol, the downlink service data packet received from the server is de-encapsulated into downlink service data, so that the downlink service data can be processed by the security platform, where the downlink service data packet may include the encrypted second feedback data packet.

The communication protocol between the security platform and the server is different from the communication protocol between the security platform and the service terminals. Therefore, in a process of the IoT service processing, when the security platform performs a service data interaction with the server, through the communication protocol between the security platform and the server, the security platform may encapsulate the uplink service data required to be sent to the server, and decapsulate the downlink service data packet received from the server, realizing data interaction between the edge terminal and the server. The security platform in the private network can realize data interaction with servers in the public network or private network through communication protocol conversion and interface processing.

Furthermore, it should be noted that in the embodiment of the present disclosure, data in data packets may be sent separately (as shown in FIG. 6) or can be sent together, which is not limited in the embodiment of the present disclosure. In addition, the data in the data packets is not limited to the data mentioned in the above embodiment.

In the embodiment of the present disclosure, through the edge access method, the access of multiple IoT edge service terminals may be completed based on one edge security platform equipment, and an edge security subnet may be built, so as to manage multiple accessed service terminals and supervise the uplink and downlink service data of the service terminals and the server through the security platform. In this way, the isolation between edge users and the server is achieved, functions such as security protection of transmission data are implemented, and the data security and equipment security of the IoT system are improved. The security module hardware with complex security mechanisms may be eliminated inside the service terminal, which reduces the cost of a single terminal and the complexity of the system. When users choose a large number of edge service terminals to access the system, the cost can be significantly reduced, Moreover, confidential key service data such as databases that are originally stored in the edge service terminals are transferred to the edge security platform for storage, reducing the risk of confidential data being leaked and tampered with.

FIG. 10 is a flow chart illustrating a data transmission method according to an embodiment of the present disclosure, which is applied to a server in an Internet of Things (IoT) system. The IoT system further includes a security platform and a service terminal. The server communicates with the service terminal through the security platform, and a first feature database is stored in the security platform. The method includes steps below.

At step 601, an encrypted match success result data packet sent by the security platform is received. The encrypted match success result data packet is obtained as follows: the security platform receives a first request data packet sent from the service terminal, where the first request data packet includes: feature data that is obtained by the service terminal by performing feature extraction on the initial data collected through the collection channel; and collection channel information corresponding to the feature data. The feature data is matched in the first feature database. In the case that feature information matched with the feature data exists in the first feature database, a first feedback data packet is generated based on the feature information and the collection channel information, and sent to the service terminal, so that the service terminal operates based on the first feedback data packet. A match success result data packet is generated, and encrypted.

At step 602, the match success result data packet is obtained by decrypting the encrypted match success result data packet.

At step 603, a service recording is performed based on the match success result data packet.

Optionally, a second feature database is stored in the server, the second feature database includes the first feature database, and the amount of feature information in the first feature database is less than the amount of feature information in the second feature database.

An encrypted second request data packet sent by the security platform is received. The encrypted second request data packet is obtained as follows: in the case that there is no feature information matched with the feature data in the first feature database, the security platform generates a second request data packet based on the feature data, the collection channel information and the match failure result, and encrypts the second request data packet.

The second request data packet is obtained by decrypting the encrypted second request data packet.

The feature data in the second request data packet is matched in the second feature database.

A second feedback data packet is generated based on the match result and the collection channel information, and an encryption operation is performed on the second feedback data packet to obtain an encrypted second feedback data packet.

The encrypted second feedback data packet is sent to the security platform, so that the security platform obtains the second feedback data packet by decrypting the encrypted second feedback data packet, and sends the second feedback data packet to the service terminal to enable the service terminal to operate according to the second feedback data packet.

Service recording is made based on the match result.

Optionally, before receiving the encrypted match success result packet sent by the security platform, the method also includes:

receiving a device authentication request sent by the security platform when the IoT system is started;

in response to the device authentication request, sending a generated asymmetric algorithm public key to the secure terminal, and storing a generated asymmetric algorithm private key, so that the secure terminal obtains the device authentication information ciphertext by encrypting the device authentication information with the asymmetric algorithm public key, and sends the device authentication information ciphertext to the server, where the device authentication information includes the terminal identifications of various service terminals connected to the security platform and a count of the terminals, as well as the platform identification of the security platform;

obtaining the device authentication information by decrypting the device authentication information ciphertext;

authenticating the security platform and each service terminal connected to the security platform based on the device authentication information;

sending device authentication passing information to the security platform when the authentication on the security platform and each business terminal connected to the security platform is passed, so that the security platform receives the device authentication passing information and completes the device authentication initialization.

Optionally, after the device authentication initialization is completed, the method further includes:

receiving a key acquisition request sent by the security platform, where the key acquisition request is used to obtain a symmetric algorithm key required for encryption and decryption operations after the IoT system is started this time;

generating a symmetric algorithm key in response to the key acquisition request;

obtaining a symmetric algorithm key ciphertext by encrypting the symmetric algorithm key using the asymmetric algorithm private key;

sending the symmetric algorithm key ciphertext to the security platform, enabling the security platform to obtain the symmetric algorithm key by decrypting the symmetric algorithm key ciphertext using a stored asymmetric algorithm public key, and completing the key initialization.

Optionally, after completing the key initialization, the method further includes:

receiving a database verification request sent from the security platform, where the database verification request carries database information about the first feature database currently stored by the security platform, and the database verification request is used to request the server to verify whether the first feature database currently stored in the security platform is the latest first feature database based on the database information;

performing verification based on the database information;

in response to confirming that the first feature database currently stored in the security platform is the latest first feature database, sending verification passing information to the security platform, enabling the security platform to receive the verification passing information, and completing the database initialization.

Optionally, after performing verification based on the database information, the method further includes:

in response to confirming that the first feature database currently stored in the security platform is not the latest first feature database, sending the latest first feature database to the security platform, so that the security platform, when receiving the latest first feature database, replaces the first feature database currently stored with the latest first feature database; and receiving a database verification request sent by the security platform again until the verification is successful, so that the security platform receives the verification passing information from the server and completes the database initialization.

Optionally, the database information is a first hash value obtained by performing a hashing encoding on the first feature database currently stored in the security platform, before performing verification based on the database information, the method further includes:

obtaining a second hash value by performing hashing encoding on the first feature database currently stored in the server;

the performing verification based on the database information includes:

verifying whether the first feature database currently stored in the security platform is the latest first feature database by comparing whether the first hash value is consistent with the second hash value.

For the steps performed by the server in this embodiment, please refer to the contents in the above embodiments, which will not be described again in this embodiment.

In the embodiment of the present disclosure, through the edge access method, the access of multiple IoT edge service terminals may be completed based on one edge security platform equipment, and an edge security subnet may be built, so as to manage multiple accessed service terminals and supervise the uplink and downlink service data of the service terminals and the server through the security platform. In this way, the isolation between edge users and the server is achieved, functions such as security protection of transmission data are implemented, and the data security in the IoT system is improved. The security module hardware with complex security mechanisms may be eliminated inside the service terminal, which reduces the cost of a single terminal and the complexity of the system. When users choose a large number of edge service terminals to access the system, the cost can be significantly reduced, Moreover, confidential key service data such as databases that are originally stored in the edge service terminals are transferred to the edge security platform for storage, reducing the risk of confidential data being leaked and tampered with.

Figure 11:
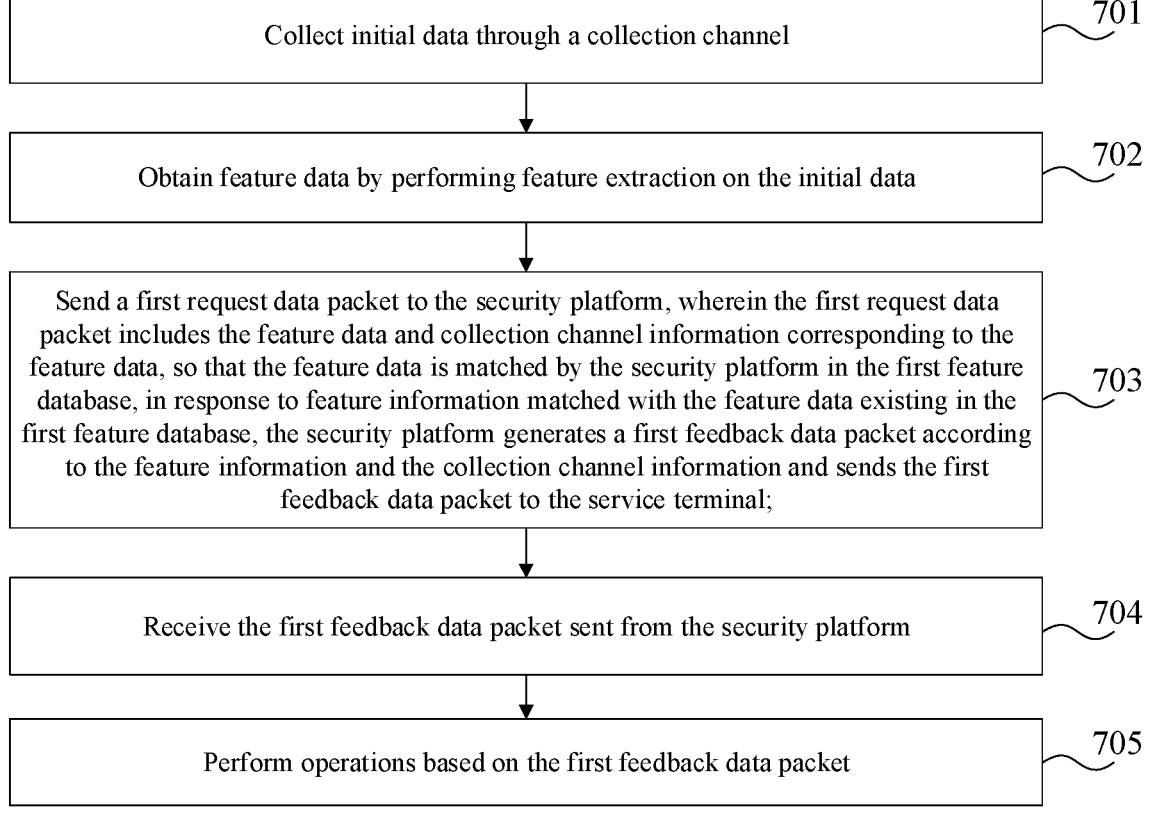
FIG. 11 is a flow chart illustrating a fourth data transmission method according to an embodiment of the present disclosure.

FIG. 11 is a flow chart illustrating a data transmission method according to an embodiment of the present disclosure, which is applied to a service terminal in an Internet of Things (IoT) system. The IoT system further includes a server and a security platform. The server communicates with the service terminal through the security platform, and a first feature database is stored in the security platform. The method includes steps below.

At step 701, initial data is collected through a collection channel.

At step 702, feature data is obtained by performing a feature extraction on the initial data.

At step 703, a first request data packet is sent to the security platform, where the first request data packet includes the feature data and collection channel information corresponding to the feature data, so that the security platform performs matching on the feature data in the first feature database. In the case that there is feature information matched with the feature data in the first feature database, a first feedback data packet is generated according to the feature information and the collection channel information, and sent to the service terminal.

At step 704, a first feedback data packet sent by the security platform is received.

At step 705, operations are performed according to the first feedback data packet.

Optionally, the service terminal is connected to at least one photographing device, the photographing devices and the collection channels are in a one-to-one correspondence, and the initial data is captured by the photographing device corresponding to the collection channel;

the step, in which operations are performed based on the first feedback packet, includes:

generating an image with feature annotations based on the feature information in the first feedback data packet; and displaying the image.

In response to receiving the first feedback data packet sent by the security platform, the service terminal may parse the first feedback data packet and obtain the feature information matched with the feature data searched by the security platform, as well as the collection channel information corresponding to the feature data, and then the service terminal can display the feature information for the collection channel.

In addition, in response to receiving a second feedback data packet sent by the security platform, the service terminal may parse the second feedback data packet to obtain the match result of the feature data performed by the server and the collection channel information corresponding to the feature data. If the matching in the server is successful, the match result includes the feature information matched with the feature data searched by the server, and then the service terminal can display the feature information for the collection channel. If the matching in the server fails, the match result includes matching failure information, and the service terminal can generate an image with a matching failure annotation based on the matching failure information in the second feedback data packet, and display the match failure result for the collection channel. Alternatively, the service terminal may prompt for manual intervention, or the service terminal may not perform any operation.

In practical applications, optionally, the photographing device may be a camera and the like, and the display device may be a terminal and the like, which are not limited in the embodiments of the present disclosure.

For the steps performed by the security platform in this embodiment, please refer to the contents in the above embodiments, which will not be described again in this embodiment.

In the embodiment of the present disclosure, through the edge access method, the access of multiple IoT edge service terminals may be completed based on one edge security platform equipment, and an edge security subnet may be built, so as to manage multiple accessed service terminals and supervise the uplink and downlink service data of the service terminals and the server through the security platform. In this way, the isolation between edge users and the server is achieved, functions such as security protection of transmission data are implemented, and the data security in the IoT system is improved. The security module hardware with complex security mechanisms may be eliminated inside the service terminal, which reduces the cost of a single terminal and the complexity of the system. When users choose a large number of edge service terminals to access the system, the cost can be significantly reduced, Moreover, confidential key service data such as databases that are originally stored in the edge service terminals are transferred to the edge security platform for storage, reducing the risk of confidential data being leaked and tampered with.

In combination with the above contents, an application example of the IoT system is provided, in which the initialization and service processing are performed by the server, the security platform, and the service terminals.

In this application example, a headquarter of a company (such as a confidential company) may manage, through an IoT system, the personnel entering and exiting branches in various locations, and may deploy a security platform for each branch to manage the service terminals deployed within the branch area.

After the IoT system is started, a device authentication initialization, a key initialization and a database initialization may be performed first. For a certain branch, a facial feature database of all employees and related personnel of the branch is stored in the security platform corresponding to the branch (i.e., the first feature database described above), and the server is stored with the facial feature databases of all branches of the company. In the database initialization stage, the security platform may initialize the local facial feature database.

Each service terminal deployed in the branch area is connected to multiple surveillance cameras (i.e., the photographing devices described above). During the service processing process, the service terminal may use the surveillance cameras to capture face images (i.e., the initial data above) of people entering and exiting the branch, and then perform facial feature extraction to obtain facial feature data (and the feature data described above).

The security platform corresponding to the branch may perform matching on the facial feature data in the platform's local facial feature database. If the matching in the security platform is successful, it means that the personnel corresponding to the face is a personnel of the branch. In this case, on the one hand, the security platform may obtain the first feedback data packet through packaging, and send the first feedback data packet back to the service terminal for face annotation and annotation display, that is, annotating that the personnel corresponding to the face belongs to which person in the branch. On the other hand, the security platform obtains a match success result data packet through packaging and uploading it to the server for recording this service.

If the matching in the security platform fails, the security platform requests the server to perform matching on the facial feature data in the server's local facial feature database (i.e., the second feature database described above). If the matching in the server succeeds, it means that although the personnel corresponding to the face is not personnel from the branch, but is personnel from other branches in the company. In this case, the server will obtain a second feedback data packet through packaging and encrypt the second feedback data packet, and then send the encrypted second feedback data packet back to the security platform, and record this service. The encrypted second feedback data packet is decrypted by the security platform, and sent back to the service terminal for face annotation and annotation display, that is, annotating that the personnel corresponding to the face is from other branches of the company. If the matching in the server fails, a match failure result will be encrypted and sent back to the security platform, and the service will be recorded. The security platform will decrypt the match failure result and send it back to the service terminal. The service terminal may perform face annotation and annotation display, that is, annotating that the personnel corresponding to the face is not personnel of the company. Alternatively, the service terminal does not make any annotation, but can prompt the monitoring personnel that unknown outsiders have entered the branch.

In the above application examples, the IoT system can be used to monitor personnel entering and exiting a specific area.

An embodiment of the present disclosure further provides an Internet of Things (IoT) system. Referring to FIG. 2, the IoT system 100 includes a server 10, a security platform 20 and a service terminal 30. The server 10 is in a communication connection with the service terminal 30 through the security platform 20. A first feature database is stored in the security platform 20.

The service terminal 30 is configured to collect initial data through a collection channel; obtain feature data by performing feature extraction on the initial data; send a first request data packet to the security platform, where the first request data packet includes feature data and collection channel information corresponding to the feature data.

The security platform 20 is configured to: receive the first request data packet; perform matching on the feature data in the first feature database; when feature information matched with the feature data exists in the first feature database, generate a first feedback data packet based on the feature information and the collection channel information, and send the first feedback data packet to the service terminal; generate a match success result data packet, perform an encryption operation on the match success result data packet, and send the encrypted match success result data packet to the server.

The service terminal 30 is further configured to receive the first feedback data packet; and perform operations according to the first feedback data packet.

The server 10 is configured to: receive the encrypted match success result data packet; obtain the match success result data packet by decrypting the encrypted match success result data packet; and perform a service recording according to the match success result data packet.

Optionally, the security platform 20 communicates with the server 10 through a public network or a private network, and the security platform 20 communicates with the service terminal 30 through a private network.

For the above embodiments of the Internet of Things system, since they are basically similar to the above method embodiments, the description is relatively simple. For relevant details, please refer to the description of the relevant content in the above method embodiments.

In the embodiment of the present disclosure, through the edge access method, the access of multiple IoT edge service terminals may be completed based on one edge security platform equipment, and an edge security subnet may be built, so as to manage multiple accessed service terminals and supervise the uplink and downlink service data of the service terminals and the server through the security platform. In this way, the isolation between edge users and the server is achieved, functions such as security protection of transmission data are implemented, and the data security in the IoT system is improved. The security module hardware with complex security mechanisms may be eliminated inside the service terminal, which reduces the cost of a single terminal and the complexity of the system. When users choose a large number of edge service terminals to access the system, the cost can be significantly reduced, Moreover, confidential key service data such as databases that are originally stored in the edge service terminals are transferred to the edge security platform for storage, reducing the risk of confidential data being leaked and tampered with.

An embodiment of the present disclosure further discloses an electronic device, including a memory and an executable program stored on the memory. When the program is run, the steps of the data transmission method described in the above embodiments are implemented.

In the case that the electronic device is a security platform, when the program is run, the steps performed by the security platform in the data transmission method described in the above embodiments are implemented.

In the case that the electronic device is a server, when the program is run, the steps performed by the server in the data transmission method described in the above embodiments are implemented.

In the case that the electronic device is a service terminal, when the program is run, the steps performed by the service terminal in the data transmission method described in the above embodiments are implemented.

An embodiment of the present disclosure further discloses a computer-readable storage medium storing an executable program that, when run, implements the steps of the data transmission method described in the above embodiments.

Various embodiments in the specification are described in a progressive manner, each embodiment focuses on the difference from other embodiments, and the same and similar parts of various embodiments can be referred to each other.

References herein to "one embodiment," "an embodiment," or "one or more embodiments" mean that a particular feature, structure, or characteristic described in connection with the embodiments is included in at least one embodiment of the present disclosure. Additionally, please note that wordings such as "in one embodiment" herein do not necessarily all refer to the same embodiment.

In the description provided herein, numerous specific details are set forth. However, it is understood that embodiments of the present disclosure may be practiced without these specific details. In some instances, common methods, structures and techniques have not been shown in detail in order not to obscure the understanding of this description.

In the claims, any reference signs placed between parentheses shall not be construed as limiting the claim. The word "comprising/including" does not exclude the presence of elements or steps not listed in the claim. The word "a" or "an" preceding an element does not exclude the presence of a plurality of such elements. The disclosure may be implemented by means of hardware including several distinct elements and a suitably programmed computer. In a unit claim enumerating several devices, several of these devices may be embodied by the same hardware item. The words such as "first", "second", and "third" as used do not indicate any order. These words may be interpreted as names.

Finally, it should be noted that the above embodiments are only used to illustrate the technical solutions of the present disclosure, rather than limiting them. Although the present disclosure has been described in detail with reference to the foregoing embodiments, those skilled in the art should understand that the technical solutions described in the foregoing embodiments can still be modified, or equivalent replacements for some of the technical features may be made; and these modification or replacement does not make the essence of the corresponding technical solutions deviate from the spirit and scope of the technical solutions of the embodiments of the present disclosure.

The invention claimed is:

1. A data transmission method, applied to a security platform in an Internet of Things (IoT) system, wherein the IoT system further comprises a server and a service terminal, the server is in a communication connection with the service terminal through the security platform, a first feature database is stored in the security platform, a second feature database is stored in the server, the second feature database comprises the first feature database, and an amount of feature information in the first feature database is less than the amount of feature information in the second feature database, wherein the method comprises:

receiving a first request data packet sent from the service terminal, wherein the first request data packet comprises feature data and collection channel information corresponding to the feature data, the feature data is obtained by the service terminal by performing feature extraction on initial data collected through a collection channel;

matching the feature data in the first feature database;

in response to feature information matched with the feature data existing in the first feature database, generating a first feedback data packet based on the feature information and the collection channel information and sending the first feedback data packet to the service terminal, so that the service terminal performs operations according to the first feedback data packet; and generating a match success result data packet, performing an encryption operation on the match success result data packet, and sending an encrypted match success result data packet to the server, so that the server obtains the match success result data packet through a decryption operation and performs a service recording according to the match success result data packet; and in response to no feature information matched with the feature data existing in the first feature database, generating a second request data packet based on the feature data, the collection channel information, and a match failure result; performing an encryption operation on the second request data packet; and sending an encrypted second request data packet to the server, so that the server obtains the second request data packet through a decryption operation and matches the feature data of the second request data packet in the second feature database.

2. The method according to claim 1, wherein after the sending of the encrypted second request data packet to the server, the method further comprises:

receiving an encrypted second feedback data packet sent from the server, wherein the encrypted second feedback data packet is obtained by the server through matching the feature data in the second feature database, generating a second feedback data packet based on a match result and the collection channel information, and encrypting the second feedback data packet;

obtaining the second feedback data packet by performing a decryption operation on the encrypted second feedback data packet; and sending the second feedback data packet to the service terminal, so that the service terminal performs operations according to the second feedback data packet.

3. The method according to claim 1, wherein before the receiving of the first request data packet sent from the service terminal, the method further comprises:

sending a device authentication request to the server in response to a startup of the IoT system;

receiving an asymmetric algorithm public key sent by the server, wherein the asymmetric algorithm public key is generated by the server and sent in response to the device authentication request;

obtaining a device authentication information ciphertext by encrypting device authentication information with the asymmetric algorithm public key, wherein the device authentication information comprises a terminal identification of each of service terminals connected to the security platform and a count of the terminals, as well as a platform identification of the security platform;

sending the device authentication information ciphertext to the server, so that the server obtains the device authentication information through a decryption operation, and performs authentication on the security platform and each of the service terminals connected to the security platform based on the device authentication information; and receiving device authentication passing information sent from the server, and completing device authentication initialization, wherein the device authentication passing information is sent when the authentication performed by the server on the security platform and the service terminals connected to the security platform passes.

4. The method according to claim 3, wherein after the completing device authentication initialization, the method further comprises:

sending a key acquisition request to the server, wherein the key acquisition request is used for obtaining a symmetric algorithm key required for encryption and decryption operations after the IoT system is started this time;

receiving a symmetric algorithm key ciphertext sent from the server, wherein the symmetric algorithm key ciphertext is obtained by the server by generating a symmetric algorithm key in response to the key acquisition request, and encrypting the symmetric algorithm key with an asymmetric algorithm private key generated together with the asymmetric algorithm public key; and obtaining the symmetric algorithm key by decrypting the symmetric algorithm key ciphertext with the asymmetric algorithm public key, and completing key initialization.

5. The method according to claim 4, wherein after the obtaining the symmetric algorithm key by decrypting the symmetric algorithm key ciphertext with the asymmetric algorithm public key, the method further comprises:

replacing a stored old symmetric algorithm key with the symmetric algorithm key, and completing key initialization, wherein the old symmetric algorithm key is the symmetric algorithm key required for encryption and decryption operations after the IoT system was last started.

6. The method according to claim 4, wherein after the completing key initialization, the method further comprises:

sending a database verification request to the server, wherein the database verification request carries database information about the first feature database currently stored in the security platform, and the database verification request is used to request the server to verify whether the first feature database currently stored in the security platform is the latest first feature database based on the database information;

receiving verification passing information sent from the server, and completing database initialization, wherein the verification passing information is sent when the server performs verification based on the database information and confirms that the first feature database currently stored in the security platform is the latest first feature database.

7. The method according to claim 6, wherein after the sending of the database verification request to the server, the method further comprises:

receiving a latest first feature database sent from the server, wherein the latest first feature database is sent when the server performs the verification based on the database information, and confirms that the first feature database currently stored in the security platform is not the latest first feature database;

updating the first feature database currently stored in the security platform to the latest first feature database; and sending the database verification request to the server again until receiving the verification passing information from the server, and completing database initialization.

8. The method according to claim 6, wherein before the sending of the database verification request to the server, the method further comprises:

obtaining a first hash value by performing a hash encoding on the first feature database currently stored in the security platform, using the first hash value as the database information about the first feature database;

the sending of the database verification request to the server comprises:

sending the database acquisition request the server, to cause the server to verify whether the first feature database currently stored in the security platform is the latest first feature database by comparing whether a first hash value is consistent with a second hash value, wherein the second hash value is obtained by performing a hash encoding on the first feature database currently stored in the server.

9. The method according to claim 2, wherein a first communication protocol is used between the security platform and the server, a second communication protocol is used between the security platform and the service terminal, and the first communication protocol is different from the second communication protocol;

the method further comprises:

encapsulating uplink service data to be sent to the server into an uplink service data packet through the first communication protocol, to enable the uplink service data packet to be processed by the server, and sending the uplink service data packet to the server, wherein the uplink service data packet comprises the match success result data packet and the second request data packet; and de-encapsulating, through the first communication protocol, downlink service data packet received from the server into downlink service data, to enable the downlink service data to be processed by the security platform, wherein the downlink service data packet comprises the encrypted second feedback data packet.

10. A data transmission method, applied to a server in an Internet of Things (IoT) system, wherein the IoT system further comprises a security platform and a service terminal, the server is a communication connection with the service terminal through the security platform, and a first feature database is stored in the security platform, a second feature database is stored in the server, the second feature database comprises the first feature database, and an amount of feature information in the first feature database is less than the amount of feature information in the second feature database, wherein the method comprises:

receiving an encrypted match success result data packet sent from the security platform, wherein the encrypted match success result data packet is obtained by the security platform through operations of: receiving a first request data packet sent from the service terminal, wherein the first request data packet comprises feature data and collection channel information corresponding to the feature data, the feature data is obtained by the service terminal by performing a feature extraction on initial data collected through a collection channel; matching the feature data in the first feature database; in response to feature information matched with the feature data existing in the first feature database, generating a first feedback data packet based on the feature information and the collection channel information, and sending the first feedback data packet to the service terminal, so that the service terminal operates based on the first feedback data packet, and generating a match success result data packet, and performing an encryption operation on the match success result data packet;

obtaining the match success result data packet by performing a decryption operation on the encrypted match success result data packet; and performing a service recording based on the match success result data packet;

receiving an encrypted second request data packet sent from the security platform, wherein the encrypted second request data packet is obtained by the security platform through operations of: in response to no feature information matched with the feature data existing in the first feature database, generating a second request data packet by the security platform based on the feature data, the collection channel information, and a match failure result, and performing an encryption operation on the second request data packet;

obtaining the second request data packet by decrypting the encrypted second request data packet;

matching the feature data of the second request data packet in the second feature database;

generating a second feedback data packet based on a match result and the collection channel information, and obtaining an encrypted second feedback data packet by encrypting the second feedback data packet;

sending the encrypted second feedback data packet to the security platform, so that the security platform obtains the second feedback data packet by decrypting the encrypted second feedback data packet, and sends the second feedback data packet to the service terminal to enable the service terminal to operate according to the second feedback data packet; and performing the service recording based on the match result.

11. The method according to claim 10, wherein before the receiving of the encrypted match success result data packet sent from the security platform, the method further comprises:

receiving a device authentication request sent from the security platform when the IoT system is started;

in response to the device authentication request, sending a generated asymmetric algorithm public key to the security platform, and storing a generated asymmetric algorithm private key, so that the security platform obtains a device authentication information ciphertext by encrypting device authentication information with the asymmetric algorithm public key, and sends the device authentication information ciphertext to the server, wherein the device authentication information comprises a terminal identification of each of service terminals connected to the security platform and a count of the terminals, as well as a platform identification of the security platform;

obtaining the device authentication information by decrypting the device authentication information ciphertext;

performing authentication on the security platform and each of the service terminals connected to the security platform according to the device authentication information; and sending device authentication passing information to the security platform when the authentication on the security platform and each of the service terminals connected to the security platform is passed, so that the security platform receives the device authentication passing information and completes device authentication initialization.

12. The method according to claim 11, wherein after the device authentication initialization is completed, the method further comprises:

receiving a key acquisition request sent from the security platform, wherein the key acquisition request is used to obtain a symmetric algorithm key required for encryption and decryption operations after the IoT system is started this time;

generating the symmetric algorithm key in response to the key acquisition request;

obtaining a symmetric algorithm key ciphertext by encrypting the symmetric algorithm key with the asymmetric algorithm private key; and sending the symmetric algorithm key ciphertext to the security platform, so that the security platform obtains the symmetric algorithm key by decrypting the symmetric algorithm key ciphertext with a stored asymmetric algorithm public key, and completes key initialization.

13. The method according to claim 12, wherein after key initialization is completed, the method further comprises:

receiving a database verification request sent from the security platform, wherein the database verification request carries database information about the first feature database currently stored in the security platform, and the database verification request is used to request the server to verify whether the first feature database currently stored in the security platform is the latest first feature database based on the database information;

performing verification based on the database information;

in response to confirming that the first feature database currently stored in the security platform is the latest first feature database, sending verification passing information to the security platform, so that the security platform receives the verification passing information and completes database initialization.

14. The method according to claim 13, wherein after the performing verification based on the database information, the method further comprises:

in response to confirming that the first feature database currently stored in the security platform is not the latest first feature database, sending the latest first feature database to the security platform, so that the security platform, when receiving the latest first feature database, replaces the first feature database currently stored with the latest first feature database; and receiving the database verification request sent from the security platform again until the verification is successful, so that the security platform receives the verification passing information from the server and completes the database initialization.

15. The method according to claim 13, wherein the database information is a first hash value obtained by performing a hash encoding, by the security platform, on the first feature database currently stored in the security platform; before the performing verification based on the database information, the method further comprises:

obtaining a second hash value by performing a hash encoding on the first feature database currently stored in the server;

the performing verification based on the database information comprises:

verifying whether the first feature database currently stored in the security platform is the latest first feature database by comparing whether the first hash value is consistent with the second hash value.

16. A data transmission method, applied to a service terminal in an Internet of Things (IoT) system, wherein the IoT system further comprises a server and a security platform, the server is a communication connection with the service terminal through the security platform, and a first feature database is stored in the security platform, a second feature database is stored in the server, the second feature database comprises the first feature database, and an amount of feature information in the first feature database is less than the amount of feature information in the second feature database, wherein the method comprises:

collecting initial data through a collection channel;

obtaining feature data by performing feature extraction on the initial data;

sending a first request data packet to the security platform, wherein the first request data packet comprises the feature data and collection channel information corresponding to the feature data, so that the feature data is matched by the security platform in the first feature database, in response to feature information matched with the feature data existing in the first feature database, the security platform generates a first feedback data packet according to the feature information and the collection channel information and sends the first feedback data packet to the service terminal;

receiving the first feedback data packet sent from the security platform; and performing operations based on the first feedback data packet;

wherein the method further comprises:

receiving a second feedback data packet; and performing operations based on the second feedback data packet, wherein in response to no feature information matched with the feature data existing in the first feature database, a second request data packet is generated based on the feature data, the collection channel information, and a match failure result; an encryption operation is performed on the second request data packet; and an encrypted second request data packet is sent to the server, so that the server obtains the second request data packet through a decryption operation, matches the feature data of the second request data packet in the second feature database, and sends the second feedback data packet.

17. The method according to claim 16, wherein the service terminal is connected to at least one photographing device, photographing devices and collection channels are in a one-to-one correspondence, and the initial data is captured by the photographing device corresponding to the collection channel;

the performing operations based on the first feedback data packet comprises:

generating an image with feature annotations based on the feature information in the first feedback data packet; and displaying the image.

18. An electronic device, comprising a memory and an executable program stored on the memory, wherein the program, when run, implements the steps of the data transmission method according to claim 1.

* * * * *